United States Patent
Ku et al.

(10) Patent No.: US 12,308,386 B2
(45) Date of Patent: *May 20, 2025

(54) ALL-SOLID SECONDARY BATTERY AND METHOD OF PREPARING SAME

(71) Applicant: Samsung SDI Co., Ltd., Yongin-si (KR)

(72) Inventors: Junhwan Ku, Seongnam-si (KR); Toshinori Sugimoto, Hwaseong-si (KR)

(73) Assignee: SAMSUNG SDI CO., LTD., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/495,042

(22) Filed: Oct. 26, 2023

(65) Prior Publication Data

US 2024/0063430 A1 Feb. 22, 2024

Related U.S. Application Data

(63) Continuation of application No. 16/927,097, filed on Jul. 13, 2020, now Pat. No. 11,923,502.

(30) Foreign Application Priority Data

Jan. 31, 2020 (KR) .................. 10-2020-0012188

(51) Int. Cl.
 *H01M 10/0562* (2010.01)
 *H01M 4/40* (2006.01)
 (Continued)

(52) U.S. Cl.
 CPC ....... *H01M 10/0562* (2013.01); *H01M 4/405* (2013.01); *H01M 4/505* (2013.01);
 (Continued)

(58) Field of Classification Search
 CPC .. H01M 10/0562; H01M 4/623; H01M 4/661; H01M 4/405; H01M 4/505; H01M 4/525; H01M 4/663
 See application file for complete search history.

(56) References Cited

U.S. PATENT DOCUMENTS 4,645,726 A 2/1987 Hiratani et al.
6,402,795 B1 6/2002 Chu et al.
(Continued)

FOREIGN PATENT DOCUMENTS

JP 2004206942 A 7/2004
JP 5675694 B2 2/2015
(Continued)

OTHER PUBLICATIONS

International Search Report dated Apr. 15, 2021 issued in the corresponding PCT Application No. PCT/ KR2020/019263.
(Continued)

*Primary Examiner* — Sarah A. Slifka
(74) *Attorney, Agent, or Firm* — CANTOR COLBURN LLP

(57) ABSTRACT

An all-solid secondary battery includes a solid electrolyte layer disposed between an anode layer and a cathode layer, where the solid electrolyte layer contains a first solid electrolyte layer including a first solid electrolyte and a second electrolyte layer including a second solid electrolyte, where the first solid electrolyte is disposed proximate to the anode layer, the second solid electrolyte layer is disposed proximate to the cathode layer, and the first solid electrolyte has a lithium ion conductivity greater than a lithium ion conductivity of the second solid electrolyte, where a difference between the lithium ion conductivity of the first solid electrolyte and the lithium ion conductivity of the second solid electrolyte is equal to or greater than about 2 mS/cm.

32 Claims, 17 Drawing Sheets

(51) Int. Cl.
*H01M 4/505* (2010.01)
*H01M 4/525* (2010.01)
*H01M 4/62* (2006.01)
*H01M 4/66* (2006.01)

(52) U.S. Cl.
CPC .......... *H01M 4/525* (2013.01); *H01M 4/623* (2013.01); *H01M 4/661* (2013.01); *H01M 4/663* (2013.01); *H01M 2300/008* (2013.01)

(56) References Cited

U.S. PATENT DOCUMENTS

| | | |
|---|---|---|
| 7,993,782 B2 | 8/2011 | Takada et al. |
| 8,075,865 B2 | 12/2011 | Deiseroth et al. |
| 9,214,674 B2 | 12/2015 | Yoshida |
| 9,583,786 B2 | 2/2017 | Lee et al. |
| 9,634,358 B2 | 4/2017 | Matsushita |
| 9,843,071 B2 | 12/2017 | Kato |
| 9,899,702 B2 | 2/2018 | Miyashita et al. |
| 10,158,143 B2 | 12/2018 | Suzuki et al. |
| 10,168,389 B2 | 1/2019 | Fujiki et al. |
| 2014/0093786 A1 | 4/2014 | Ito et al. |
| 2015/0147660 A1 | 5/2015 | Fujiki et al. |
| 2016/0248120 A1 | 8/2016 | Yamada et al. |
| 2016/0351953 A1 | 12/2016 | Wöhrle et al. |
| 2017/0047610 A1 | 2/2017 | Miara et al. |
| 2017/0222262 A1 | 8/2017 | Kim et al. |
| 2017/0373340 A1 | 12/2017 | Fujii et al. |
| 2018/0351159 A1 | 12/2018 | Fujiki et al. |
| 2018/0366777 A1 | 12/2018 | Sasaki |
| 2019/0190064 A1 | 6/2019 | Fujiki et al. |
| 2019/0198916 A1 | 6/2019 | Yoon et al. |
| 2019/0393482 A1* | 12/2019 | He .................... H01M 4/0402 |
| 2020/0127325 A1 | 4/2020 | Takahashi et al. |
| 2020/0144575 A1 | 5/2020 | Ku et al. |
| 2022/0109184 A1 | 4/2022 | Tsujimura et al. |

FOREIGN PATENT DOCUMENTS

| | | |
|---|---|---|
| JP | 5679748 B2 | 3/2015 |
| JP | 5930035 B2 | 6/2016 |
| JP | 6181989 B2 | 8/2017 |
| KR | 1020150018559 A | 2/2015 |
| KR | 20160085467 A | 7/2016 |
| KR | 20170077014 A | 7/2017 |
| KR | 101936827 B1 | 1/2019 |
| KR | 1020190073243 A | 6/2019 |
| KR | 20190079132 A | 7/2019 |
| KR | 1020200050855 A | 5/2020 |
| WO | 2015080450 A1 | 6/2015 |
| WO | 2018139868 A1 | 8/2018 |
| WO | 2019009228 A1 | 1/2019 |

OTHER PUBLICATIONS

J.-M. Winand et al., "Measurement of Ionic Conductivity in Solid Electrolytes," Europhysics Letters, vol. 8, No. 5, pp. 447-452, 1989.
Office Action dated Mar. 12, 2025, issued in corresponding KR Patent Application No. 10-2020-0012188, 12 pp.

* cited by examiner

ALL-SOLID SECONDARY BATTERY AND METHOD OF PREPARING SAME

CROSS-REFERENCE TO RELATED APPLICATION

This application is a continuation of U.S. application Ser. No. 16/927,097, which claims priority to and the benefit of Korean Patent Application No. 10-2020-0012188, filed on Jan. 31, 2020, in the Korean Intellectual Property Office, and all the benefits accruing therefrom under 35 U.S.C. § 119, the content of which is incorporated herein in its entirety by reference.

BACKGROUND

1. Field

The present disclosure relates to an all-solid secondary battery and a method of preparing the same.

2. Description of Related Art

Recently, the development of batteries with high energy density and increased safety is actively underway due to industrial demand. For example, lithium-ion batteries are being put into practical use not only in the fields of information-related devices and communications devices, but also in the automotive field. In the automotive field, safety is especially important to protect human lives.

Lithium-ion batteries currently available on the market use a liquid electrolyte containing a flammable organic solvent, and thus there is the possibility of overheating and fire in the event of a short circuit. Therefore, an all-solid battery using a solid electrolyte instead of a liquid electrolyte has been suggested.

An all-solid battery does not use a flammable organic solvent, and thus may significantly reduce the risk of fire or explosion, even if a short circuit occurs. Accordingly, an all-solid battery may significantly increase safety as compared to a lithium-ion battery using a liquid electrolyte.

An all-solid battery is prepared by using a sulfide-based solid electrolyte having good ion conductivity as a solid electrolyte, and interposing and pressing the same between a cathode layer and an anode layer. However, the all-solid battery with the sulfide-based solid electrolyte has a low reversible capacity at a high rate, and a short circuit frequently occurs when the all-solid battery is repeatedly charged or discharged, and thus there remains a need for improved battery materials.

SUMMARY

Provided is an all-solid secondary battery having improved interface characteristics between an anode layer and a solid electrolyte layer.

Provided is a method of preparing the all-solid secondary battery.

Additional aspects will be set forth in part in the description which follows and, in part, will be apparent from the description.

According to an embodiment, provided is an all-solid secondary battery wherein the all-solid secondary battery includes a solid electrolyte layer disposed between an anode layer and a cathode layer, wherein the solid electrolyte layer contains a first solid electrolyte layer and a second solid electrolyte layer contains a second solid electrolyte, wherein the first solid electrolyte layer is disposed proximate to the anode layer, the second solid electrolyte layer is disposed proximate to the cathode layer, and the first solid electrolyte has a lithium ion conductivity which is greater than a lithium ion conductivity of the second solid electrolyte, wherein a difference between the lithium ion conductivity of the first solid electrolyte and the lithium ion conductivity of the second solid electrolyte is equal to or greater than about 2 millisiemens per centimeter (mS/cm).

According to an embodiment, provided is a method for preparing the all-solid secondary battery, the method including:

providing a cathode layer; providing an anode layer;

contacting a first solid electrolyte and a binder to form a first composition;

contacting a second solid electrolyte and a binder to form a second composition;

disposing the first composition on a surface of the anode layer facing the cathode layer to form a first solid electrolyte layer, and disposing the second composition on a surface of the cathode layer facing the anode layer to form a second electrolyte layer to provide the all-solid secondary battery.

According to an embodiment, provided is an all-solid secondary battery including:

a solid electrolyte layer disposed between an anode layer and a cathode layer, wherein the solid electrolyte layer contains a first solid electrolyte layer including a first solid electrolyte and a second solid electrolyte layer including a second solid electrolyte, wherein the first solid electrolyte layer is disposed proximate to the anode layer, the second solid electrolyte layer is disposed proximate to the cathode layer, and the first solid electrolyte has a lithium ion conductivity greater than a lithium ion conductivity of the second solid electrolyte, and wherein the solid electrolyte layer has an argyrodite structure represented by Formula 6:

$$\text{Li}^+{}_{12-n-x}AX_{6-x}Y'_x \qquad \text{Formula 6}$$

wherein, in Formula 6,

A is P, As, Ge, Ga, Sb, Si, Sn, Al, In, Ti, V, Nb, Ta, or a combination thereof, X is S, Se, Te, or a combination thereof, Y' is Cl, Br, I, F, CN, OCN, SCN, $N_3$, or a combination thereof, $1 \leq n \leq 6$ and $0 < x < 2$, wherein n is an oxidation number of A.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
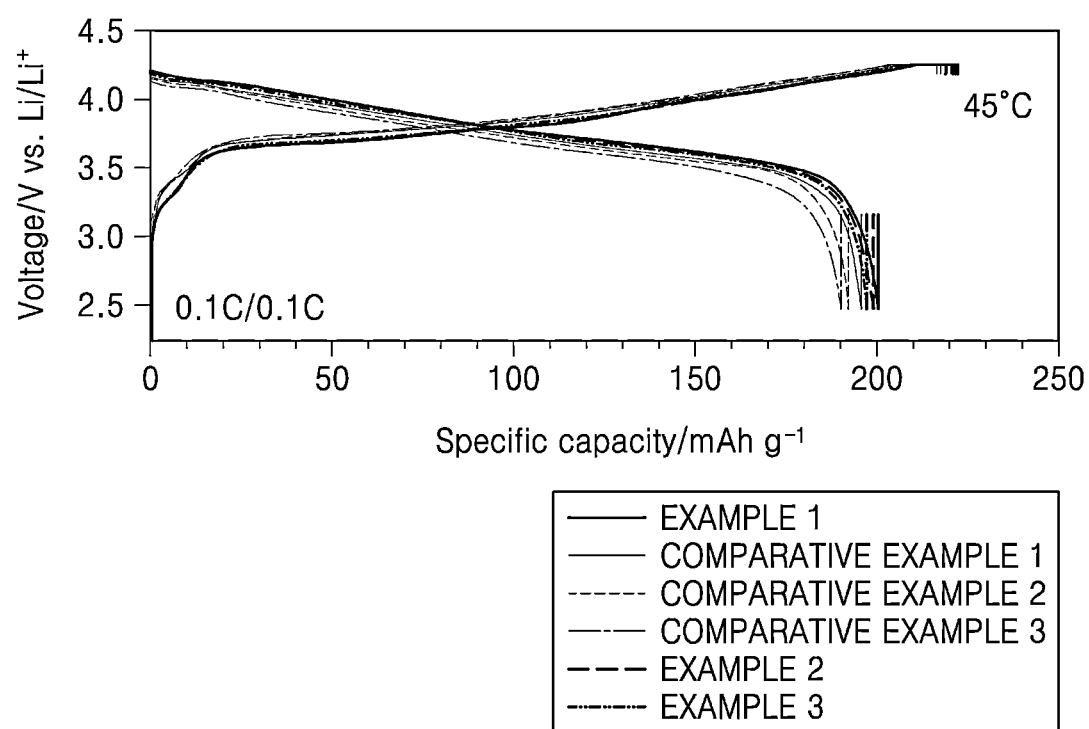
FIGS. 1A to 1C are each a graph of voltage (V vs. Li/Li$^+$) versus specific capacity (milliampere hours per gram (mAh g$^{-1}$)) for the all-solid secondary batteries of Examples 1 to 3 and Comparative Examples 1 to 3.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "At least one" is not to be construed as limiting "a" or "an." "Or" means "and/or." Expressions such as "at least one of," when preceding a list of elements, modify the entire list of elements and do not modify the individual elements of the list.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C-rate describes a discharge rate of a cell, and is obtained by dividing a total capacity of the cell by a total discharge period of time of 1 hour, e.g., a C-rate for a battery having a discharge capacity of 1.6 ampere-hours would be 1.6 amperes.

As used herein, "argyrodite structure" or "argyrodite crystal structure" means that the compound has a structure that is isostructural with argyrodite, $Ag_8GeS_6$.

As discussed herein, ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989.

Mole fraction or molar fraction ($x_i$) is defined as the amount of a constituent (expressed in moles), $n_i$, divided by the total amount of all constituents in a mixture (expressed in moles), $n_{tot}$. Mole fraction can be expressed as:

$$x_i = \frac{n_i}{n_{tot}}$$

An all-solid secondary battery and a method of preparing the same are described in more detail.

Provided is the all-solid secondary battery wherein the all-solid secondary battery includes a solid electrolyte layer disposed between an anode layer and a cathode layer. The solid electrolyte layer includes a first solid electrolyte layer disposed closer, e.g., proximate to, an anode and contains a first solid electrolyte, and a second solid electrolyte layer disposed closer, e.g. proximate, to the cathode and contains a second solid electrolyte, wherein the first electrolyte has a lithium ion conductivity higher than the second solid electrolyte, and the lithium ion conductivity difference between the first solid electrolyte and second solid electrolyte is equal to or greater than about 2 millisiemens per centimeter (mS/cm). The ion conductivity may be measured at 25° C.

The first solid electrolyte layer and the second solid electrolyte layer are disposed adjacent to the anode layer and the cathode layer, respectively.

For example, the first solid electrolyte layer is disposed directly on the anode layer, and the second solid electrolyte layer is disposed directly on the cathode layer.

The ion conductivity difference between the first solid electrolyte and the second solid electrolyte is about 2 mS/cm to about 20 mS/cm, for example, about 2 mS/cm to about 10 mS/cm. The ion conductivity may be measured at 25° C.

According to another embodiment, the ion conductivity difference between the first solid electrolyte layer, containing the first solid electrolyte, and the second solid electrolyte layer, containing the second solid electrolyte, is about 2 mS/cm or greater, for example, about 3 mS/cm to about 16 mS/cm, about 4 mS/cm to about 12 mS/cm, or about 5 mS/cm to about 8 mS/cm.

In the manufacture of an all-solid secondary battery, a close interface can be formed between the electrode layers and solid electrolyte layers through a process of disposing the solid electrolytes between the cathode layer and the anode layer and pressing the same. However, the all-solid secondary battery prepared according to such a method has a disadvantage of low reversible capacity at a high rate or a short circuit frequently occurs, and thus improvements are needed.

The disadvantages in an all solid-secondary battery described above can be effectively eliminated by reducing interface resistance between the anode layer and the solid electrolyte layer and thereby allowing for improved lithium ion transport at a high rate, and thus an all-solid secondary battery has an increased reversible capacity and a reduced short circuit occurrence is provided.

In the all-solid secondary battery according to an embodiment, the first solid electrolyte layer and the second solid electrolyte layer are disposed proximate to the anode layer and the cathode layer, respectively, and the first solid electrolyte layer and the second solid electrolyte layer are each formed using a first solid electrolyte and a second solid electrolyte, each having a different composition and ion conductivity.

The first solid electrolyte layer has an ion conductivity higher than the second solid electrolyte layer and the ion conductivity difference between the first solid electrolyte layer and the second solid electrolyte layer is about 2 mS/cm or more. The first solid electrolyte layer is coated on the anode layer and has a thickness less than the thickness of the second solid electrolyte layer, and thus maximizes movement of lithium ions.

The second solid electrolyte layer has a lower lithium ion conductivity than the first solid electrolyte layer and has better mechanical and electrochemical stability. The all-solid secondary battery having the first electrolyte layer and the second electrolyte layer described herein has improved lithium ion mobility, thereby improving high-rate charge/discharge characteristics.

The first solid electrolyte and the second solid electrolyte have ion conductivity at about 1 mS/cm or more, about 1.3 mS/cm or more, about 1.6 mS/cm or more, or about 2.0 mS/cm at 25° C., 45° C., or 60° C.

The first solid electrolyte and the second solid electrolyte have high ion conductivities at about 1 mS/cm or more and thus may be used as an electrolyte in an all-solid secondary battery.

Ion conductivity of the first solid electrolyte at 25° C., 45° C., or 60° C. is greater than ion conductivity of the second solid electrolyte at 25° C., 45° C., or 60° C., respectively.

An ion conductivity of the first solid electrolyte at 25° C. is about 3 mS/cm to about 7 mS/cm, for example, about 5 mS/cm to about 7 mS/cm, and the ion conductivity at 45° C. is about 10 mS/cm to about 15 mS/cm, for example, about 12 mS/cm to about 14 mS/cm, and the ion conductivity at 60° C. is about 16 mS/cm to about 20 mS/cm, for example, about 17 mS/cm to about 19 mS/cm. And, an ion conductivity of the second solid electrolyte at 25° C. is about 1 mS/cm to about 5 mS/cm, for example, about 1 mS/cm to about 2 mS/cm, and the ion conductivity at 45° C. is about 3 mS/cm to about 8 mS/cm, for example, about 4 mS/cm to about 6 mS/cm, and the ion conductivity at 60° C. is about 5 mS/cm to about 12 mS/cm, for example, about 7 mS/cm to about 11 mS/cm, for example, about 9 mS/cm to about 11 mS/cm.

According to an embodiment, the first solid electrolyte and the second solid electrolyte are sulfide-based solid electrolytes having an argyrodite crystal structure, and the ion conductivity of the first solid electrolyte is greater than the second solid electrolyte.

The first solid electrolyte contains a compound having an argyrodite crystal structure including i) Br, I, or a combination thereof, and ii) Cl. The second solid electrolyte includes a compound having an argyrodite crystal structure including i) Br, I, or a combination thereof and ii) Cl. An amount of Br, I, or a combination thereof in the first solid electrolyte is greater than an amount of Br, I, or a combination thereof in the second solid electrolyte.

According to an embodiment, a bromine amount of the first solid electrolyte is greater than a bromine amount of the second solid electrolyte.

A difference between the stoichiometry of Br, I, or a combination thereof in the first solid electrolyte and the amount of Br, I, or a combination thereof in the second solid electrolyte is, for example, about 0.1 to about 1.25, for example, about 0.6 to about 0.9. The difference between the amount of Br, I, or a combination thereof may be, for example, a difference in mole fraction of Br, I, or a combination thereof. The solid electrolyte may comprise, for example, bromine, and a difference in the bromine amount refers to a difference between the bromine amount, in moles, in the first solid electrolyte and the bromine amount, in moles, in the second solid electrolyte.

The halogen atoms in the first solid electrolyte may be a composition represented by $Cl_{1.1}Br_{0.4}$ to $Cl_{0.25}Br_{1.25}$, for example, and the halogen atoms in the second solid electrolyte may be a composition represented by $Cl_{1.25}Br_0$ to $Cl_{1.2}Br_{0.3}$. The total molar concentration of halogen atoms in each of the first solid electrolyte and the second solid electrolyte is, for example, about 1.0 to about 1.5, for example, about 1.25 to about 1.5.

According to an embodiment, the first solid electrolyte layer contains the first solid electrolyte having an argyrodite crystal structure including i) Br, I, or a combination thereof, and ii) Cl. The second solid electrolyte layer includes the second solid electrolyte having an argyrodite crystal structure including i) Br, I, or a combination thereof, and ii) Cl. A ratio of Br, I, or a combination thereof to Cl of the first solid electrolyte is greater than a ratio of Br, I, or a combination thereof to Cl of the second solid electrolyte.

A difference between a ratio of Br, I, or a combination thereof to Cl of the first solid electrolyte and a ratio of Br, I, or a combination thereof to Cl of the second solid electrolyte is about 0.1 to about 5, about 0.3 to about 3, about 0.4 to about 2, or about 0.75 to about 1.5.

The first solid electrolyte includes a compound having an argyrodite crystal structure and is represented by Formula 1. The second solid electrolyte layer includes a compound having an argyrodite crystal structure of Formula 1 and is represented by Formula 2, Formula 2-1, or a combination thereof.

$$Li_aM_xPS_bX_cCl_d \quad \text{Formula 1}$$

wherein, in Formula 1,
M is Na, K, Fe, Mg, Ca, Ag, Cu, Zr, Zn, or a combination thereof;
X is Br, I, or a combination thereof; and
$0 \leq x \leq 0.07$, $5 \leq a \leq 6$, $4 \leq b \leq 6$, $c>0$, $d>0$, and $0<(c+d) \leq 2$, $5 \leq (a+x) \leq 6$, $$Li_aM_xPS_bCl_d \quad \text{Formula 2}$$

wherein, in Formula 2,
M is Na, K, Fe, Mg, Ca, Ag, Cu, Zr, Zn, or a combination thereof; and
$0 \leq x \leq 0.07$, $5 \leq a \leq 6$, $4 \leq b \leq 6$, $0<d \leq 2$, and $5 \leq (a+x) \leq 6$.

$$Li_aM_xPS_bX1_{c1}Cl_{d1} \quad \text{Formula 2-1}$$

wherein, in Formula 2-1,
M is Na, K, Fe, Mg, Ca, Ag, Cu, Zr, Zn, or a combination thereof;
X1 is Br, I or a combination thereof; and
$0 \leq x \leq 0.07$, $5 \leq a \leq 6$, $4 \leq b \leq 6$, $c1>0$, $d1>0$, $0<(c1+d1) \leq 2$, and $5 \leq (a+x) \leq 6$.

In Formula 2-1, c1 is smaller than c in Formula 1. In addition, the c1/d1 in Formula 2-1 is smaller than the c/d in Formula 1.

In an aspect, the second solid electrolyte has an argyrodite crystal structure and is represented by Formula 1, wherein $c=0$ and $0<d \leq 2$.

The first solid electrolyte containing the compound of Formula 1 has higher ion conductivity than the second solid electrolyte containing the compound of Formula 2, and has brittle properties when forming a film.

The second solid electrolyte has a lower lithium ion conductivity than the first solid electrolyte, and has better film-forming properties and good mechanical properties. The second solid electrolyte exists on an interface with the cathode layer and thus is able to prevent deterioration of oxidation stability.

A thickness of the first solid electrolyte layer compared to a thickness of the second solid electrolyte layer is in a ratio of about 1:1 to about 1:10, for example, about 1:2 to about 1:8, for example, about 1:2.5 to about 1:6, for example about 1:3 to about 1:4. The ratio represents a comparison of the thickness of a first solid electrolyte layer and a second solid electrolyte layer after pressing.

The first solid electrolyte layer and the second solid electrolyte layer are obtained by disposing the first solid electrolyte layer and the second solid electrolyte layer between the cathode layer and the anode layer, respectively, and then pressing a laminate thereof. The thickness of the first solid electrolyte layer and the second solid electrolyte layer refers to the thickness of each layer after pressing. In this regard, the pressing is about 500 MPa or less, for example, about 300 MPa or less, about 250 MPa or less, about 200 MPa or less, about 150 MPa or less, or about 100 MPa or less, for example about 50 MPa to about 100 MPa.

The thickness of the second solid electrolyte layer is greater than the thickness of the first solid electrolyte, and the thickness of the first solid electrolyte layer is about 1 μm to about 35 μm, about 1 μm to about 30 μm, about 1 μm to about 25 μm, about 10 μm to about 25 μm, about 12 μm to about 25 μm, or about 15 μm to about 25 μm. In addition, the thickness of the second solid electrolyte layer is about 10 μm to about 60 μm, for example, about 20 μm to about 50 μm, for example, about 25 μm to about 45 μm.

According to an embodiment, the thickness of the first solid electrolyte layer and the second solid electrolyte layer after pressing may be reduced to about 60% to about 80%, for example, about 70%, of the thickness of the first solid electrolyte layer and the second solid electrolyte layer before pressing.

According to an embodiment, the thickness of the first solid electrolyte layer and the second solid electrolyte layer after pressing may be reduced to about 60% to about 80%, for example, about 60 to about 70%, of the thickness of the first solid electrolyte and the second solid electrolyte before pressing.

The total thickness of the solid electrolyte layer in the all-solid secondary battery, according to an embodiment, is about 11 μm to about 200 μm, for example, about 50 μm to about 150 μm, about 75 μm to about 125 μm, or about 95 μm to about 105 μm.

A compound represented by Formula 1 is a compound represented by Formula 3.

$$Li_aM_xPS_bBr_cCl_d \qquad \text{Formula 3}$$

wherein, in Formula 3,

M is Na, K, Fe, Mg, Ca, Ag, Cu, Zr, Zn, or a combination thereof; and $0 \leq x \leq 0.07$, $5 \leq a \leq 6$, $4 \leq b \leq 6$, $c>0$, $d>0$, $0<(c+d) \leq 2$, $5 \leq (a+x) \leq 6$.

The compound represented by Formula 1 is, for example, a compound represented by Formula 4.

$$(Li_{1-x1}M_{x1})_{7-y}PS_{6-y}(Br_{1-x2}Cl_{x2})_y \qquad \text{Formula 4}$$

wherein, in Formula 4,

M is Na, K, Fe, Mg, Ca, Ag, Cu, Zr, Zn, or a combination thereof; and $0 \leq x1 < 1$, $0 < x2 < 1$, and $0 \leq y \leq 2$.

In Formulas 1 to 4, $0 \leq x \leq 0.05$, b is a number greater than 4 and less than 6, for example, 4 to 5.8, for example, 4 to 4.5.

The compound represented by Formula 1 is, for example, $Li_{5.5}PS_{4.5}Cl_{0.75}Br_{0.75}$, $Li_{5.5}PS_{4.5}Cl_{0.25}Br_{1.25}$, $Li_{5.5}PS_{4.5}Cl_{1.25}Br_{0.25}$, $Li_{5.5}PS_{4.5}Cl_{0.1}Br_{1.4}$, $Li_{5.45}Na_{0.05}PS_{4.5}Cl_{0.25}Br_{1.25}$, $Li_{5.5}PS_{4.5}Cl_{0.25}Br_{1.25}$, $Li_{5.45}Na_{0.05}PS_{4.5}Cl_{0.1}Br_{1.4}$, $Li_{5.45}Na_{0.05}PS_{4.5}Cl_{0.1}Br_{1.4}$, $Li_5Na_{0.05}PS_4Cl_{0.01}Br_{1.99}$, $Li_{5.74}PS_{4.74}Cl_{0.01}Br_{1.25}$, $Li_5PS_4Cl_{0.01}Br_{1.99}$, $Li_{5.45}K_{0.05}PS_{4.5}Cl_{0.25}Br_{1.25}$, $Li_{5.45}K_{0.05}PS_{4.5}Cl_{0.1}Br_{1.4}$, $Li_{5.45}K_{0.05}PS_{4.5}Cl_{0.1}Br_{1.4}$, $Li_5K_{0.05}PS_4Cl_{0.01}Br_{1.99}$, or a combination thereof.

The compound represented by Formula 2 is, for example, $Li_{5.75}PS_{4.75}Cl_{1.25}$, $Li_{5.75}PS_{4.5}Cl_{1.5}$, $Li_{5.5}PS_{4.5}Cl_{1.5}$, $Li_{5.45}Na_{0.05}PS_{4.5}Cl_{1.5}$, $Li_{5.45}K_{0.05}PS_{4.5}Cl_{1.5}$, $Li_{5.74}PS_{4.74}Cl_{1.26}$, $Li_5Na_{0.05}PS_4Cl_2$, $Li_5K_{0.05}PS_4Cl_2$, $Li_{5.5}PS_{4.5}Cl_{1.2}$, $Li_{5.7}Na_{0.05}PS_{4.75}Cl_{1.25}$, $Li_{5.7}Cu_{0.05}PS_{4.75}Cl_{1.25}$, $Li_{5.65}Cu_{0.1}PS_{4.75}Cl_{1.25}$, or a combination thereof.

When the first solid electrolyte layer and the second solid electrolyte layer are formed between the anode layer and the cathode layer, crack generation is suppressed in the electrolyte layer after pressing for battery preparation, and deterioration of oxidation stability is prevented on the interface between the cathode layer and the solid electrolyte layer. As a result, the reversible charge/discharge capacity at a high rate may be increased.

The all-solid secondary battery includes the cathode layer, the anode layer, and the solid electrolyte layer disposed between the cathode layer and the anode layer, and the solid electrolyte layer includes the sulfide-based solid electrolyte. The solid electrolyte layer includes the sulfide-based solid electrolyte, thereby preventing a side reaction with lithium metal included in the anode layer, and thus cycle characteristics of the all-solid secondary battery are improved.

A packing density is 60% or more of a true density of both the first solid electrolyte layer and the second solid electrolyte layer, and a ratio of the packing density to the true density of the first solid electrolyte layer is greater than the ratio of the packing density to the true density of the second solid electrolyte layer, and a difference in the ratio of the packing density to the true density between the first solid electrolyte layer and the second solid electrolyte layer is about 2% to about 5%. For example, a density of the second solid electrolyte layer is about 1 gram per cubic centimeter (g/cc) to about 2 g/cc, for example, 1.55 (g/cc) to about 1.6 g/cc, and a density of the first solid electrolyte layer is about 1.2 g/cc to about 2.1 g/cc, for example, about 1.7 g/cc to about 1.75 g/cc.

Each packing density of the first solid electrolyte layer and the second solid electrolyte layer may be about 60% or more, about 75% or more, about 80% or more, for example, about 95% or more, for example, about 95% to about 100%, for example, about 95 to about 99.5%, of the true density. When the packing density of the first solid electrolyte layer and the second solid electrolyte layer compared to the true density are within these ranges, the number and the type of pores formed in the first solid electrolyte layer and the second solid electrolyte layer become smaller, and short circuit occurrence may be reduced. When a ratio of the packing density to the true density of the first solid electrolyte layer and the second solid electrolyte layer are out of these ranges, a gap is easily formed in the solid electrolyte layer and lithium metal is easily precipitated in the gap, and thus a short circuit can easily occur. The ratio of the packing density to the true density of the first solid electrolyte layer and the second solid electrolyte layer is a comparison of the packing density to the true density of the first solid electrolyte layer, as a percentage, and the packing density to the true density of the second solid electrolyte layer, as a percentage, respectively. The true density of the first solid electrolyte layer or the second solid electrolyte layer may be calculated based on a nominal density of each material that forms each solid electrolyte layer, a mass ratio of each material, and a filling rate of the solid electrolyte layer, which is measured by observing a cross section of the solid electrolyte layer with an SEM. The filling rate may be set to a density ratio.

The packing density is measured by measuring, in micrometers, a thickness change before and after performing warm isostatic press (WIP) and dividing the weight of a sheet by volume. WIP is performed at, for example, about 60° C. to about 90° C. at a pressure of about 200 megapascals (MPa) to about 500 MPa for about 10 minutes to about 50 minutes.

WIP is performed at a temperature of about 85° C. at a pressure of about 490 MPa for about 30 minutes.

In an aspect, an all-solid secondary battery has a ratio of a packing density to a true density in each of the first solid electrolyte layer and the second solid electrolyte layer that is about 0.6:1 or more, and the ratio of the packing density to the true density of the first solid electrolyte layer is less than a ratio of packing density to the true density of the second solid electrolyte layer, and a difference between the ratio of the packing density to the true density of the first solid electrolyte layer and the ratio of the packing density to the true density of the second solid electrolyte layer is about 0.02:1 to about 0.05:1.

The ratio of the packing density to the true density of the first solid electrolyte layer is smaller than the ratio of the packing density to the true density of the second solid electrolyte layer. A difference between the ratio of the packing density to the true density of the second solid electrolyte layer and the ratio of the packing density to the true density of the first solid electrolyte layer is 2% to 5% or 3% to 4.5%.

In the all-solid secondary battery according to an embodiment, the cathode layer contains a compound including the sulfide-based solid electrolyte having the argyrodite crystal structure represented by Formula 1, a compound represented by Formula 2, or a combination thereof, $$Li_aM_xPS_bX_cCl_d \quad \text{Formula 1}$$

wherein, in Formula 1,
M is sodium (Na), potassium (K), iron (Fe), magnesium (Mg), calcium (Ca), silver (Ag), copper (Cu), zirconium (Zr), zinc (Zn), or a combination thereof,
X is bromine (Br), iodine (I), or a combination thereof, and
$0 \le x < 1$, $5 \le (a+x) \le 7$, $5 \le a \le 6$, $4 \le b \le 6$, and $0 < (c+d) \le 2$, $(c/d) > 4$.

$$Li_aM_xPS_bCl_d \quad \text{Formula 2}$$

wherein, in Formula 2,
M is Na, K, Fe, Mg, Ca, Ag, Cu, Zr, Zn, or a combination thereof; and
$0 \le x \le 0.07$, $5 \le a \le 6$, $4 \le b \le 6$, $0 < d \le 2$, and $5 \le (a+x) \le 6$.

An amount of the sulfide-based solid electrolyte in the cathode is about 2 parts by weight to about 70 parts by weight, for example, about 3 parts by weight to about 30 parts, about 5 parts by weight to about 20 parts, or about 7 parts by weight to about 10 parts by weight, based on 100 parts by weight of a cathode active material. When the amount of the sulfide-based solid electrolyte in the cathode is within this range, high-voltage stability of the all-solid secondary battery is improved.

The all-solid secondary battery according to an embodiment will be described in detail with reference to the accompanying drawings.

Figure 11:
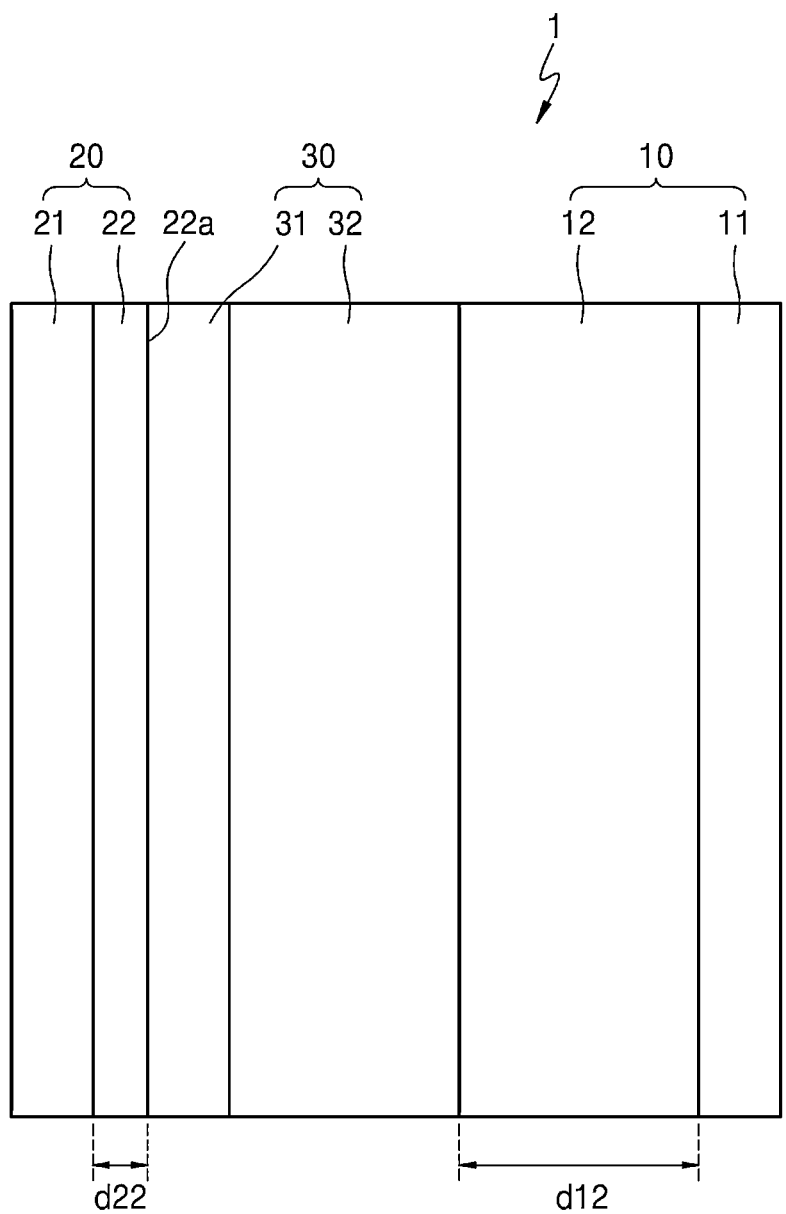
FIGS. 11 to 13 are each a cross-sectional view of an embodiment of an all-solid secondary battery.
Figure 12:
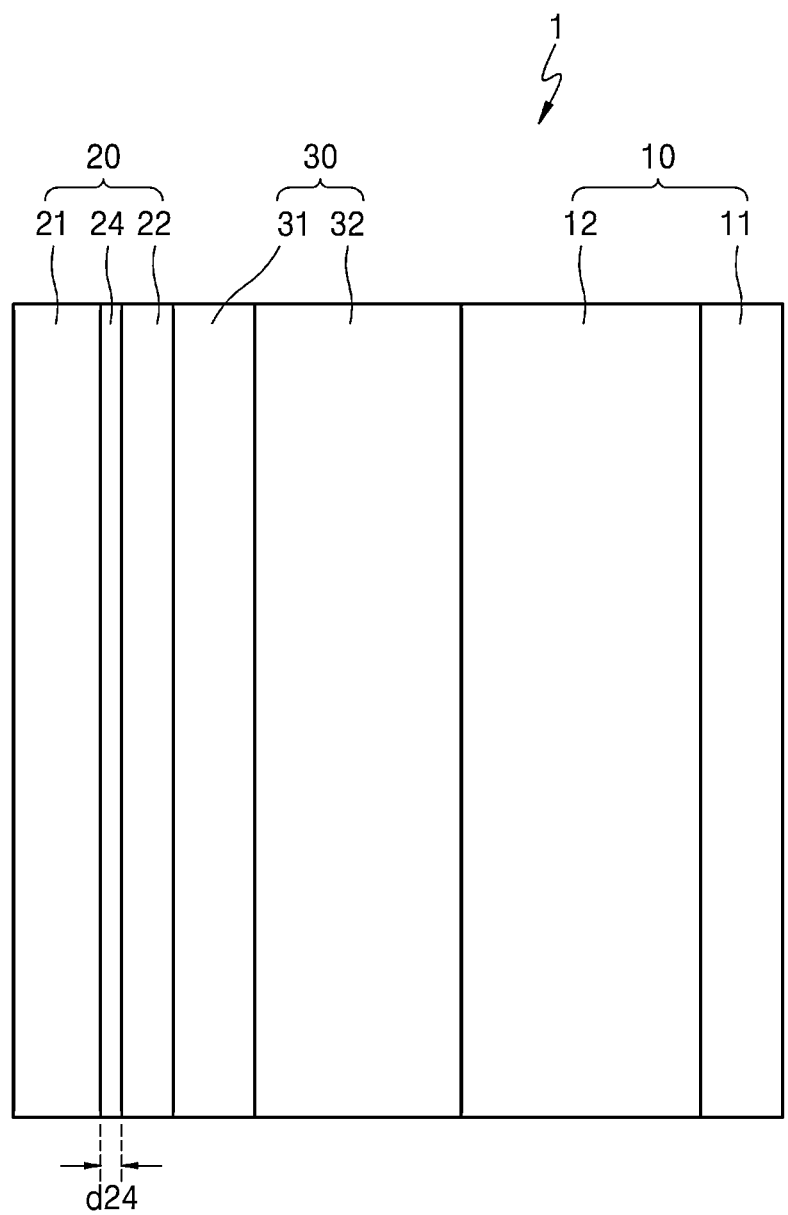
Figure 13:
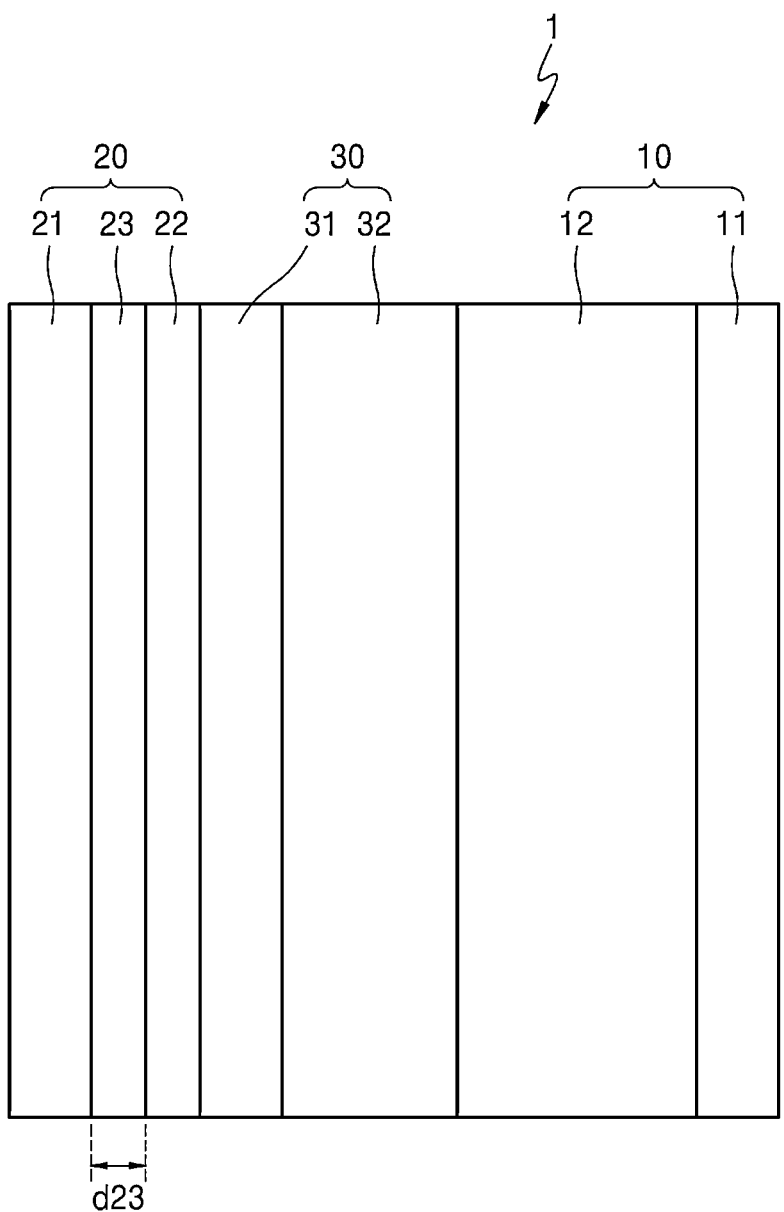

Referring to FIGS. 11 to 13, the all-solid secondary battery 1 comprises the anode layer 20 including an anode current collector layer 21 and a first anode active material layer 22; the cathode layer 10 including a cathode active material layer 12; and the solid electrolyte layer 30 disposed between the anode layer 20 and the cathode layer 10. The solid electrolyte layer 30 contains the first solid electrolyte layer 31 according to an embodiment and the second electrolyte layer 32 according to an embodiment. The cathode layer 10 may contain the sulfide-based solid electrolyte according to an embodiment. The cathode layer 10 contains, for example, the cathode active material, the sulfide-based solid electrolyte, and a conductive agent.

Anode Layer

Referring to FIGS. 11 to 13, the anode layer 20 includes an anode current collector layer 21 and a first anode active material layer 22, and the first anode active material layer 22 includes an anode active material.

The anode active material included in the first anode active material layer 22 is in the shape of, for example, a particle. An average particle diameter of the anode active material in the shape of a particle is, for example, about 4 μm or less, about 3 μm or less, about 2 μm or less, about 1 μm or less, or about 900 nm or less. The average particle diameter of the anode active material in the shape of a particle is, for example, about 10 nm to about 4 μm, about 10 nm to about 3 μm, about 10 nm to about 2 μm, about 10 nm to about 1 μm, or about 10 nm to about 900 nm. Reversible absorbing and/or desorbing of lithium during charge and discharge may be more efficient when the anode active material has an average particle diameter in this range. The average particle diameter of the anode active material is, for example, a median diameter (D50) measured by using a laser-type particle size distribution meter.

The anode active material included in the first anode active material layer 22 includes, for example, a carbonaceous anode active material, a metal anode active material, a metalloid anode active material, or a combination thereof.

The carbonaceous anode active material is for example amorphous carbon. Amorphous carbon is, for example, carbon black (CB), acetylene black (AB), furnace black (FB), ketjen black (KB), graphene or a combination thereof. Any suitable amorphous carbon may be used. Amorphous carbon is carbon having no crystallinity or very low crystallinity, and is distinguishable from crystalline carbon or graphite-based carbon.

The metal anode active material or metalloid anode active material includes gold (Au), platinum (Pt), palladium (Pd), silicon (Si), silver (Ag), aluminum (Al), bismuth (Bi), tin (Sn) or zinc (Zn), but is not limited thereto, and any metal anode active material or a metalloid anode active material capable of forming an alloy or a compound with lithium may be used. For example, nickel (Ni) is not a metal anode active material as nickel (Ni) does not form an alloy with lithium.

The first anode active material layer 22 may include one type of an anode active material, or a mixture of a plurality of different anode active materials. For example, the first anode active material layer 22 may include only amorphous carbon or gold (Au), platinum (Pt), palladium (Pd), silicon (Si), silver (Ag), aluminum (Al), bismuth (Bi), tin (Sn), zinc (Zn), or a combination thereof. In an embodiment, the first anode active material layer 22 includes a mixture of amorphous carbon and gold (Au), platinum (Pt), palladium (Pd), silicon (Si), silver (Ag), aluminum (Al), bismuth (Bi) tin (Sn), zinc (Zn), or a combination thereof. A mixing ratio of the amorphous carbon and gold (Au), as a weight ratio, is, for example, about 10:1 to about 1:2, about 5:1 to about 1:1, or about 4:1 to about 2:1, but is not limited to these ranges, and is selected according to desired characteristics of the solid secondary battery 1. As the anode active layer has the composition above, cycle characteristics of the all-solid secondary battery 1 are enhanced even more.

The anode active material included in the first negative electrode active material layer 22 includes, for example, a mixture of first particles formed of amorphous carbon and second particles formed of a metal or a metalloid. The metal-containing anode active material or metalloid-containing anode active material includes, for example, gold (Au), platinum (Pt), palladium (Pd), silicon (Si), silver (Ag), aluminum (Al), bismuth (Bi), tin (Sn), zinc (Zn), or a combination thereof. The metalloid is alternatively a semiconductor. An amount of the second particles is about 8 weight percent (wt %) to about 60 wt %, about 10 wt % to about 50 wt %, about 15 wt % to about 40 wt %, or about 20 wt % to about 30 wt %. When the second particles are in these weight percent ranges, cycle characteristics of the all-solid secondary battery 1 are improved.

The first anode active material layer 22 includes, for example, a binder. The binder is, for example, styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, polymethyl methacrylate, or a combination thereof, but are not necessarily limited thereto, and any suitable binder may be used. The binder may comprise a single binder or a plurality of different binders.

The first anode active material layer 22 includes the binder and thus is stabilized on the anode current collector 21. In addition, cracking of the first negative electrode active material layer 22 is prevented despite a volume change and/or a relative position change of the first anode active material layer 22 in a charge/discharge process. For example, when the first anode active material layer 22 does not include the binder, the first anode active material layer 22 may be easily separated from the anode current collector 21. A portion where the first anode active material layer 22 is separated from the anode current collector 21 is exposed to the anode current collector 21 and contacts the solid electrolyte layer 30, thereby increasing the possibility of a short circuit. The first anode active material layer 22 is prepared, for example, by applying a slurry, in which materials forming the first anode active material layer 22 are dispersed, on the anode current collector 21, and drying the slurry. The anode active material may be stably dispersed in the slurry by including the binder in the first anode active material layer 22. For example, when the slurry is applied on the anode current collector 21 by a screen printing method, clogging of a screen (for example, clogging by agglomerates of the anode active material) may be prevented.

A thickness d22 of the first anode active material layer is, for example, about 50% or less, about 40% or less, about 30% or less, about 20% or less, about 10% or less, or about 5% or less of a thickness d12 of the cathode active material layer. The thickness d22 of the first anode active material layer is, for example, about 1 micrometer ($\mu m$) to about 20 $\mu m$, about 2 $\mu m$ to about 10 $\mu m$, or about 3 $\mu m$ to about 7 $\mu m$. Lithium dendrites can form between the first negative electrode active material layer 22 and the negative electrode current collector 21. However, when the thickness d22 of the first anode active material layer is within this range, collapse due to lithium dendrites in the first negative electrode active material layer 22 is prevented. As a result, the cycle characteristics of the all-solid-state secondary battery 1 are improved. When the thickness (d22) of the negative electrode active material layer is within the above range, the energy density of the all-solid secondary battery 1 increases and the internal resistance of the all-solid secondary battery 1 including the first negative active material layer 22 decreases. The cycle characteristics of the all-solid-state secondary battery 1 are improved.

When the thickness d22 of the first anode active material layer decreases, for example, a charge capacity of the first anode active material layer 22 also decreases. The charge capacity of the first anode active material layer 22 is, for example, about 50% or less, about 40% or less, about 30% or less, about 20% or less, about 10% or less, about 5% or less, or about 2% or less than the charge capacity of the cathode active material layer 12. The charge capacity of the first anode active material layer 22 is, for example, about 0.1% to about 50%, about 0.1% to about 40%, about 0.1% to about 30%, about 0.1% to about 20%, about 0.1% to about 10%, about 0.1% to about 5%, or about 0.1% to about 2% of the charge capacity of the cathode active material layer 12. When the charge capacity of the first anode active material layer 22 is within this range, collapse of the first anode active material layer due to the formation of lithium dendrites between the first anode active material layer 22 and the anode current collector 21 is suppressed during repeated charge/discharge cycles.

As a result, the cycle characteristics of the all-solid-state secondary battery 1 are improved. When the charge capacity of the first anode active material layer 22 is within the above range, the energy density of the all-solid secondary battery 1 is improved and internal resistance of the all-solid secondary battery 1 including the first anode active material layer 22 is suppressed.

A charge capacity of the cathode active material layer 12 is obtained by multiplying a charge capacity density in milliampere hours per gram (mAh/g) of the cathode active material by a mass of the cathode active material layer 12. When various types of cathode active materials are used, a value is calculated for each cathode active material by multiplying a charge capacity density of the cathode active material by a mass of the cathode active material, and the sum of these values is the charge capacity of the cathode active material layer 12. A charge capacity of the first anode active material layer 22 is calculated in the same manner. That is, the charge capacity of the first anode active material layer 22 is obtained by multiplying a charge capacity density (mAh/g) of the anode active material by a mass of the anode active material in the first anode active material layer 22. When various types of anode active materials are used, a value is calculated for each anode active material by multiplying a charge capacity density of the anode active material by a mass of the anode active material, and the sum of these values is the charge capacity of the anode active material layer 22. The charge capacity densities of the cathode active material and the anode active material are capacities estimated by using an all-solid half-cell using lithium metal as a counter electrode. The charge capacities of the cathode active material layer 12 and the first anode active material layer 22 are directly measured by measuring a charge capacity using the all-solid half-cell. The charge capacity density is obtained by dividing the measured charge capacity by the mass of each active material. Alternatively, the charge capacities of the cathode active material layer 12 and the first anode active material layer 22 may be initial charge capacities measured at the first charge cycle.

The anode current collector 21 is formed of, for example, a material which does not react with lithium, that is, does not form an alloy or a compound. Materials forming the anode current collector 21 are, for example, a metal such as copper (Cu), stainless steel, titanium (Ti), iron (Fe), cobalt (Co), or nickel (Ni), but are not limited thereto, and any suitable electrode current collector may be used. The anode current collector 21 may be formed of a single metal, or may be formed of an alloy of two or more types of metal, or may be formed of a coating material. The anode current collector 21, for example, is in the form of a plate or a foil.

The first anode active material layer 22 may further include additives, used for an all-solid secondary battery 1, for example, a filler, a dispersant, an ion conductive agent, or a combination thereof.

Referring to FIG. 12, the all-solid secondary battery 1 further includes, for example, a thin film 24 including an element capable of forming an alloy with lithium on the anode current collector 21. The thin film 24 is disposed between the anode current collector 21 and the first anode active material layer 22. The thin film 24 includes, for example, an element capable of forming an alloy with lithium. Elements capable of forming an alloy with lithium are, for example, gold, silver, zinc, tin, indium, silicon, aluminum, bismuth, or a combination thereof, but are not necessarily limited thereto, and any suitable element capable of forming an alloy with lithium may be used. The thin film 24 is formed of one of these metals, or an alloy of various of metals. The thin film 24 is disposed on the anode current collector 21, for example, and thus a precipitation formed of the second anode active material layer (not shown), precipitated between the thin film 24 and the first anode active material layer 22, is further flattened, thereby enhancing cycle characteristics of the all-solid secondary battery 1.

A thickness d24 of the thin film is, for example, about 1 nm to about 800 nm, about 10 nm to about 700 nm, about 50 nm to about 600 nm, or about 100 nm to about 500 nm. When the thickness d24 of the thin film is within this range, a reduction in an energy density of the all-solid-state battery is prevented by reducing the amount of lithium deposited at the anode by absorbing lithium by the thin film 24. The thin film 24 may be disposed on the anode current collector 21 by, for example, a vacuum deposition method, a sputtering method, a plating method, or a combination thereof, but is not necessarily limited thereto, and any suitable method capable of forming the thin film 24 may be used.

Figure 9:
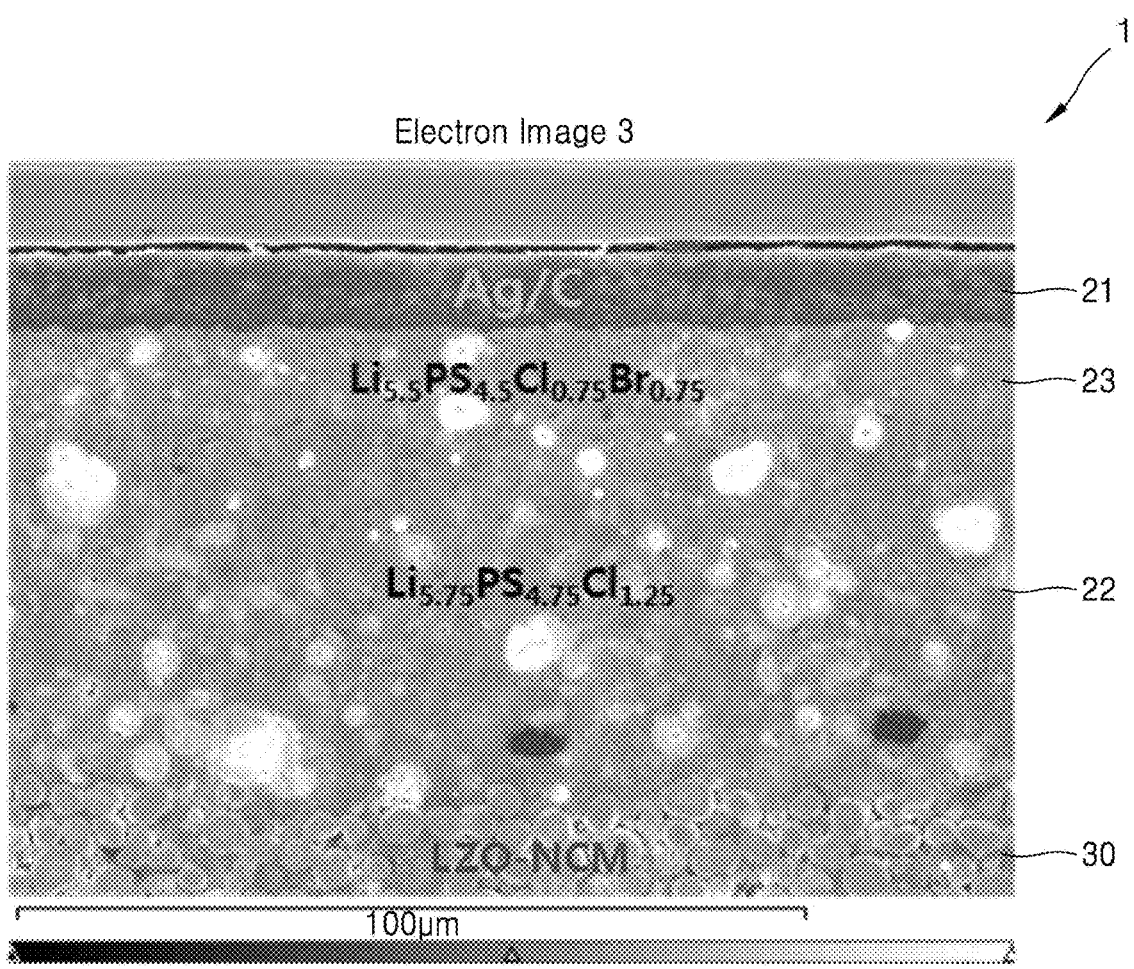
FIG. 9 and FIGS. 10A to 10F are images of the all-solid secondary battery prepared according to Example 2 analyzed using electron scanning microscope-energy dispersive X-ray spectroscopy (SEM-EDAX).
Figure 10A:
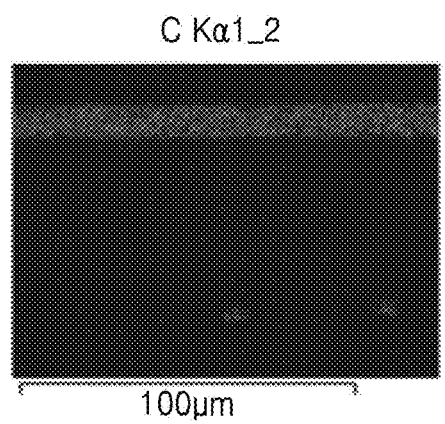
Figure 10B:
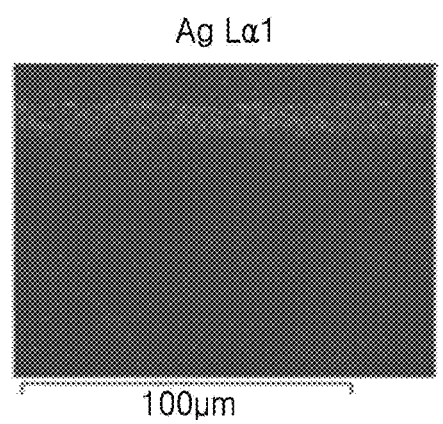
Figure 10C:
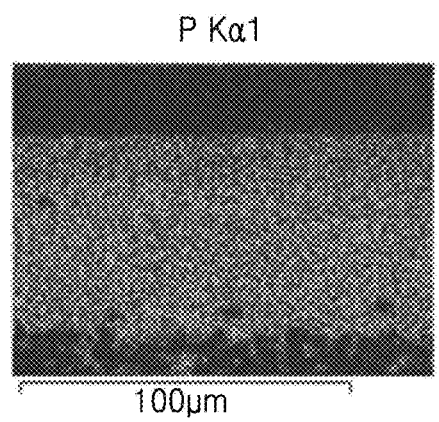
Figure 10D:
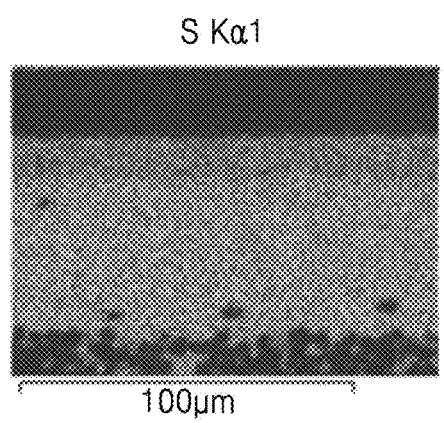
Figure 10E:
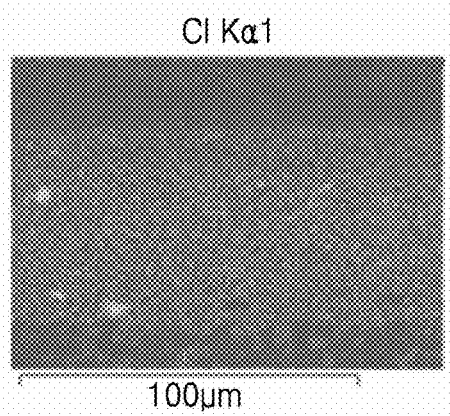
Figure 10F:
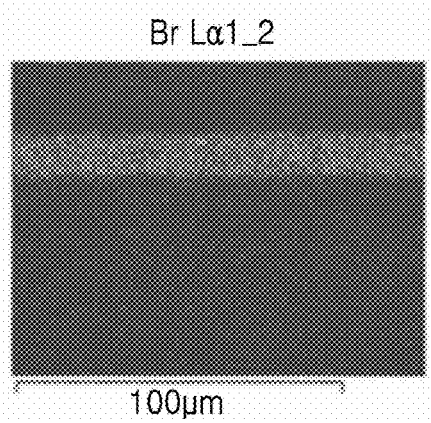

Referring to FIG. 9, the all-solid secondary battery 1 further includes, for example, a second anode active material layer 23 disposed between the anode current collector 21 and the solid electrolyte layer 30. The all-solid secondary battery 1 further includes the second anode active material layer 23 disposed between the anode current collector 21 and the first anode active material layer 22. Although not shown in the drawing, the all-solid secondary battery 1 further includes, for example, a second anode active material layer 23 disposed between the solid electrolyte layer 30 and the first anode active material layer 22. Although not shown in the drawing, the all-solid secondary battery 1 further includes, for example, the second anode active material layer 23 disposed inside the first anode active material layer 22.

The second anode active material layer 23 is a metal layer including lithium metal or a lithium alloy. The metal layer includes lithium metal or a lithium alloy. Accordingly, the second anode active material layer 23 is a metal layer including lithium metal and thus acts as, for example, a lithium reservoir. Lithium alloys are, for example, a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof, but are not limited thereto, and any suitable lithium alloy may be used. The second anode active material layer 23 may be formed of a lithium alloy, lithium metal, or of various types of alloys.

The thickness (d23) of the second anode active material layer is not particularly limited, but is, for example, about 1 μm to about 1000 μm, about 1 μm to about 500 μm, about 1 μm to about 200 μm, about 1 μm to about 150 μm, about 1 μm to about 100 μm, or about 1 μm to about 50 μm. When the thickness (d23) of the second anode active material layer is within these ranges, the second negative electrode active material layer 23 may serve as a lithium reservoir. If the thickness (d23) of the second anode active material layer is within the above range, increase of the mass and volume of the all-solid-state secondary battery 1 and deterioration of the cycle characteristics can be suppressed. The second anode active material layer 23 may be, for example, a metal foil having a thickness within the above range.

In the all-solid secondary battery 1, the second anode active material layer 23, for example, is disposed between the anode current collector 21 and the first anode active material layer 22 before assembling the all-solid secondary battery 1, or is precipitated between the anode current collector 21 and the first anode active material layer 22 by charging after assembling the all-solid secondary battery.

When the second anode active material layer 23 is disposed between the anode current collector 21 and the first anode active material layer 22 before assembling the all-solid secondary battery 1, the second anode active material layer 23 acts as a lithium reservoir because the second anode active material layer 23 is a metal layer including lithium. Cycle characteristics of the all-solid secondary battery 1 including the second anode active material layer 23 are improved. For example, a lithium foil is disposed between the anode current collector 21 and the first anode active material layer 22 before assembling the all-solid secondary battery 1.

When the second anode active material layer 23 is disposed by charging after assembling the all-solid secondary battery 1, the energy density of the all-solid secondary battery 1 increases because the second anode active material layer (23) is not included when the all-solid secondary battery (1) is assembled. For example, when the all-solid secondary battery 1 is charged, charging is performed in excess of the charge capacity of the first anode active material layer 22. That is, the first anode active material layer 22 is overcharged. At an initial stage of charging, lithium is absorbed in the first anode active material layer 22. That is, the anode active material included in the first anode active material layer 22 forms an alloy or a compound with lithium ions having moved from the cathode layer 10. When a charge exceeds the capacity of the first anode active material layer 22, for example, lithium is precipitated on a back surface of the first anode active material layer 22, that is, between the anode current collector 21 and the first anode active material layer 22, and a metal layer corresponding to the second anode active material layer 23 is formed by the precipitated lithium. The second anode active material layer 23 is a metal layer mainly formed of lithium (i.e., lithium metal). Such a result is obtained because, for example, the anode active material included in the first anode active material layer 22 is formed of a material forming an alloy or a compound with lithium. During discharge, lithium of the first anode active material layer 22 and the second anode active material layer 23, that is, metal layers, is ionized and moves in the direction of the cathode layer 10. Therefore, lithium may be used as an anode active material in the all-solid secondary battery 1. In addition, the first anode active material layer 22 covers the second anode active material layer 23 and thus serves as a protective layer for the second anode active material layer 23, that is, a metal layer, and serves to suppress the growth of precipitation of lithium dendrites at the same time. Therefore, suppression of a short circuit and capacity reduction of the all-solid secondary battery 1 are possible, and, as a result, cycle characteristics of the all-solid secondary battery 1 are improved. In addition, when the second anode active material layer 23 is disposed by charging the all-solid secondary battery 1 after assembly, the anode current collector 21 and the first anode active material layer 22 and a region between the same, for example, are Li-free regions, which do not contain lithium (Li) metal or a lithium (Li) alloy in an initial state or a post-discharge state of the all-solid secondary battery.

Referring to FIG. 12, the all-solid secondary battery 1 has a structure in which the second anode active material layer 23 is disposed on the anode current collector 21, and the solid electrolyte layer 30 is directly disposed on the second anode active material layer 23. The second anode active material layer 23 is, for example, a lithium metal layer or a lithium alloy layer.

Since the solid electrolyte layer 30 includes the sulfide-based solid electrolyte, a side reaction of the second anode active material layer 23, as a lithium metal layer, to the solid electrolyte layer 30 is suppressed, so that cycle characteristics of the all-solid secondary battery 1 are improved.

Solid Electrolyte Layer

Referring to FIGS. 11 to 13, the solid electrolyte layer 30 contains the first solid electrolyte layer 31 and the second solid electrolyte layer 32.

In addition to the first solid electrolyte layer and the second solid electrolyte layer, a typical sulfide-based solid electrolyte may be further included in the solid electrolyte layer. The solid electrolyte layer further includes, for example, $P_2S_5$, $Li_2S$—$P_2S_5$—LiX (where X is a halogen element), $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (where m and n are each a positive number, and Z is one selected from Ge, Zn and Ga), $Li_2S$—$GeS_2$, $Li_2S$—$SiS_2$—$Li_3PO_4$, $Li_2S$—$SiS_2$-$Li_pMO_q$ (where p and q are each a positive number, and M is one selected from P, Si, Ge, B, Al, Ga, and In), or a combination thereof. The sulfide-based solid electrolyte further included in the solid electrolyte layer has a structure that is amorphous, crystalline, or a mixture thereof.

The typical sulfide-based solid electrolyte further includes, for example, an argyrodite-type solid electrolyte represented by Formula 6:

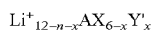
$$Li^+_{12-n-x}AX_{6-x}Y'_x \quad \text{Formula 6}$$

wherein, in Formula 6,
A is P, As, Ge, Ga, Sb, Si, Sn, Al, In, Ti, V, Nb, Ta, or a combination thereof,
X is S, Se, Te, or a combination thereof,
Y' is Cl, Br, I, F, CN, OCN, SCN, $N_3$, or a combination thereof, and
$1 \leq n \leq 6$ and $0 < x < 2$, wherein n is an oxidation number of A.

The argyrodite-type solid electrolyte, for example, includes $Li_{7-x}PS_{6-x}Cl_x$ (where $0<x<2$), $Li_{7-x}PS_{6-x}Br_x$ (where $0<x<2$), $Li_{7-x}PS_{6-x}I_x$ (where $0<x<2$), or a combination thereof. The argyrodite-type solid electrolyte includes $Li_6PS_5Cl$, $Li_6PS_5Br$, $Li_6PS_5I$, or a combination thereof.

The solid electrolyte layer 30 containing the first solid electrolyte layer 31 and the second solid electrolyte layer 32 further includes, for example, a binder. The binder included in the solid electrolyte layer 30, for example, may be a styrene-butadiene-styrene copolymer, acrylic resin, styrene-butadiene rubber (SBR), polytetrafluoroethylene, polyvinylidene fluoride, polyethylene, a vinylidene fluoride/hexafluoropropylene copolymer, polyacrylonitrile, polymethyl methacrylate, or a combination thereof, but is not limited thereto, and any suitable binder may be used. The binder of the solid electrolyte layer 30 may be the same type as or different from the binder of the cathode active material layer 12 and the anode active material layer 22.

According to an embodiment, the first solid electrolyte layer 31 and the second solid electrolyte layer 32 may use a styrene-butadiene-styrene copolymer, acrylic resin, or a combination thereof, as a binder. According to an embodiment, the first solid electrolyte layer 31 may contain a styrene-butadiene-styrene (SBS) copolymer as a binder, and the second solid electrolyte layer 32 may contain acrylic resin as a binder. According to an embodiment, the first solid electrolyte layer 31 may contain an acrylic resin as a binder, and the second solid electrolyte layer 32 may contain an acrylic resin as a binder. According to an embodiment, the first solid electrolyte layer 31 may contain a styrene-butadiene-styrene copolymer (SBS) as a binder, and the second solid electrolyte layer 32 may contain SBS as a binder.

An amount of the binder in the first solid electrolyte layer is about 0.5 parts by weight to about 1.5 parts by weight or less, based on 100 parts by weight of the total weight of the first solid electrolyte comprising the binder. And, an amount of the binder in the second solid electrolyte layer is about 1 part by weight to 2 parts by weight, based on 100 parts by weight of the total weight of the second solid electrolyte comprising the binder. The amount of the binder in the first solid electrolyte layer is less than the amount of the binder in the second solid electrolyte layer, and a difference between the amount of the binder in the first solid electrolyte layer and the second solid electrolyte layer is about 0.5 parts by weight to about 1.5 parts by weight. When the difference in the amount of binder is within this range, the all-solid secondary battery may be prepared, wherein movement of lithium ions is maximized and mechanical properties are excellent. This results in improved high-rate charge/discharge characteristics, and a reduction in short circuits.

When SBS is used as the binder, dispersion of the first solid electrolyte in the first solid electrolyte layer may be more uniform. As a result, when coating of a composition for forming the first solid electrolyte layer on the anode layer is performed, the coating may be uniformly applied, and, as a result, resistance between the anode layer and the solid electrolyte layer is reduced, and thus the all-solid secondary battery having an improved capacity retention rate may be prepared.

A dispersant may be further added to the composition for forming a first solid electrolyte layer. As the dispersant, Croda's KD14, KD9, and KD13, and BYK's DISPERBYK, and the like may be used, and such a dispersant is a nonionic polymeric dispersant. The BYK company DISPERBYK includes, for example, DISPERBYK-180 and DISPERBYK-192. The first solid electrolyte layer may use a smaller amount of the binder than the second solid electrolyte layer. A difference in the amount of the binder is, for example, about 0.5% by weight to about 1.5% by weight. When the first solid electrolyte layer and the second solid electrolyte layer having this difference in the amount of the binder, interfacial resistance between the electrode layer and the solid electrolyte layer is reduced and movement of lithium becomes more efficient, and thus the all-solid secondary battery having an improved reversible capacity and capacity retention rate at a high rate, may be prepared.

Cathode Layer

The cathode layer 10 includes the cathode current collector 11 and the cathode active material layer 12.

The cathode current collector 11 is, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or a plate or foil formed of an alloy thereof. The cathode current collector 11 may be omitted.

The cathode active material layer 12 includes, for example, the cathode active material and the solid electrolyte. The solid electrolyte included in the anode layer 10 is similar to or different from the solid electrolyte included in the solid electrolyte layer 30. For details of the solid electrolyte, refer to the solid electrolyte layer 30. According to an embodiment, the solid electrolyte contains the sulfide-based solid electrolyte.

The cathode layer contains the cathode active material, and the anode active material is a compound capable of reversibly absorbing and desorbing lithium ions and is, for example, a lithium transition metal oxide having a layered crystal structure, a lithium transition metal oxide having an olivine crystal structure, a lithium transition metal oxide having a spinel crystal structure, or a combination thereof. The cathode active material is, for example, a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganese oxide (NCM), lithium manganate, lithium and iron phosphate, a lithium nickel sulfide, a lithium copper sulfide, a lithium sulfide, a lithium iron oxide, a lithium vanadium oxide, or a combination thereof, but is not limited thereto, and any suitable cathode active material may be used. The cathode active material may be formed of one of these examples alone or as a mixture of at least two of the examples of the cathode active material.

The lithium transition metal oxide is a compound represented by, for example, $Li_aA_{1-b}B'_bD_2$ (where $0.90 \leq a \leq 1$, and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$, and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 < < 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2GeO_4$ (where, $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); $LiFePO_4$. In the compound, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. A compound having a coating layer added on a surface thereof may be also used, and a mixture having a compound described above and a coating layer which are added thereto, may be also used. The coating layer added to the surface of the compound includes, for example, a coating element compound comprising an oxide, a hydroxide, an oxyhydroxide, an oxycarbonate, a hydroxycarbonate, or a combination thereof. The compound forming the coating layer is amorphous or crystalline. The coating element included in the coating layer is Mg, Al, Co, K, Na, Ca, Si, Ti, V, Sn, Ge, Ga, B, As, Zr, or a combination thereof. A method of forming the coating layer is selected such that the method does not adversely affect properties of the cathode active material. The coating method is, for example, spraying, coating, or dipping. Because specific coating methods can be well understood by a person of ordinary skill in the art, detailed descriptions thereof will be omitted.

The cathode active material includes, for example, a lithium salt of a transition metal oxide having a layered rock salt type structure. The "layered rock salt type structure," for example, is a structure wherein an oxygen atom layer and a metal atom layer are alternately and regularly arranged in the direction of <111> of a cubic rock salt type structure, whereby each atom layer forms a two-dimensional plane. "Cubic rock salt type structure" refers to a sodium chloride type (NaCl type) structure, which is a type of crystal structure, and, specifically, has a structure in which face-centered cubic lattices (FCCs) forming each of cations and anions are arranged to be displaced from each other by ½ of a ridge of a unit lattice. A lithium transition metal oxide having the layered rock salt type structure is a ternary lithium transition metal oxide, for example, $LiNi_xCo_yAl_zO_2$ (NCA) or $LiNi_xCo_yMn_zO_2$ (NCM) ($0 < x < 1$, $0 < y < 1$, $0 < z < 1$, $(x+y+z)=1$). When the cathode active material includes a ternary lithium transition metal oxide having a layered rock salt structure, the energy density and thermal stability of the all-solid secondary battery 1 are further improved.

The anode active material may be covered by the coating layer as described above. The coating layer may be a coating layer that covers the cathode active material of the all-solid secondary battery. The coating layer is, for example, $Li_2O$—$ZrO_2$, or the like.

When the cathode active material includes nickel (Ni) as a ternary lithium transition metal oxide, such as NCA or NCM, the capacity density of the all-solid secondary battery 1 is increased, whereby metal elution of the cathode active material in a charged state may be reduced. As a result, cycle characteristics in the charge state of the all-solid state secondary battery 1 are improved.

The shape of the cathode active material is, for example, a sphere shape or an elliptical shape. A particle size of the cathode active material is not particularly limited and is within a range applicable to an all-solid secondary battery. An amount of the cathode active material in the cathode layer 10 is also not particularly limited and is within a range applicable to an all-solid secondary battery.

The cathode layer 10 may further include additives, for example, a conductive agent, a binder, a filler, a dispersant, an ion conductive auxiliary agent, or a combination thereof, in addition to the cathode active material and the solid electrolyte. The conductive agent is, for example, graphite, carbon black, acetylene black, Ketjen black, carbon fiber, metal powder, or a combination thereof. The binder is, for example, styrene butadiene rubber (SBR), polytetrafluoroethylene, polyvinylidene fluoride, polyethylene, or a combination thereof. As a coating agent, a dispersant, an ion conductive auxiliary agent, or a combination thereof, which may be mixed with the anode layer 10, may be used.

A method of preparing a sulfide-based solid electrolyte according to an embodiment comprises providing a mixture including a lithium compound, containing a raw material composition including a P element, a S element, a Li element, and a halogen element, and preparing a sulfide-based solid electrolyte by reacting the mixture.

The mixture includes a raw material composition containing a P element, a S element, a Li element, and a lithium compound containing a halogen element. The raw material composition containing the P element, the S element, and the Li element includes, for example, $Li_2S$ and $P_2S_5$. The lithium compound containing a halogen element is, for example, a lithium halide. A lithium halide is, for example, LiCl, LiI, or LiBr.

In the operation of preparing the sulfide-based solid electrolyte by reacting the mixture, for example, a solid electrolyte precursor is obtained by reacting the mixture and the solid electrolyte precursor is treated with heat at about 350° C. to about 550° C. to prepare the sulfide-based solid electrolyte.

A method for reacting the mixture is not particularly limited, but may be, for example, a mechanical milling (MM) method. For example, when the MM method is used, the sulfide-based solid electrolyte precursor is prepared by reacting starting materials such as $Li_2S$ and $P_2S_5$ by stirring the same using a ball mill or the like. A stirring speed and a stirring time of the MM method are not particularly limited, but the faster the stirring speed, the faster the formation speed of the sulfide-based solid electrolyte precursor, and the longer the stirring time, the higher the conversion rate from the raw materials to the sulfide-based solid electrolyte precursor.

Subsequently, the solid electrolyte precursor obtained by the MM method, or the like, is heat-treated at a predetermined temperature, and then pulverized to prepare a particulate solid electrolyte. When the solid electrolyte has glass transition properties, change of the solid electrolyte from an amorphous form to a crystalline form by heat-treatment is possible. The heat-treatment temperature is, for example, about 350° C. to about 550° C. Due to the heat-treatment temperature, the sulfide-based solid electrolyte with a uniform composition is easily obtained.

A heat-treatment time depends on the heat-treatment temperature, for example, about 1 hour to about 100 hours, about 10 hours to 80 hours, about 20 hours to about 28 hours, or about 24 hours. Both improved ionic conductivity and high-temperature stability are obtained when the heat-treatment time is in this range.

A heat-treatment may be carried out in an inert atmosphere.

The inert atmosphere comprises nitrogen, argon, or a combination thereof, but is not necessarily limited thereto, and any one suitable inert atmosphere may be used.

In the method of preparing an all-solid secondary battery, the sulfide-based solid electrolyte is prepared by the method described above, and the first solid electrolyte (31) is laminated on the anode layer (20) by using the sulfide-based solid electrolyte, and the second solid electrolyte layer (32) is laminated on the first solid electrolyte (31).

According to an embodiment, the first solid electrolyte layer 31 and the second solid electrolyte layer 32 may be prepared in the form of a sheet by coating and drying a composition for forming a first solid electrolyte layer and a composition for forming a second solid electrolyte layer on an additional base material and then separating the same from the base material. As a non-limiting example, a polyethylene terephthalate film, or the like, may be used as the base material.

According to an embodiment, the first solid electrolyte layer 31 may be formed by coating and drying, or transferring the composition for forming a first solid electrolyte layer on the anode layer. The second solid electrolyte layer 32 may be in the form of a sheet.

Subsequently, the all-solid battery may be prepared by packing the cathode layer, the solid electrolyte layer, and the anode layer with a packaging material, and then pressing the same. The pressing may be performed by using roll pressing, hot pressing, WIP, or the like.

During the pressing, mass production is possible when roll pressing or hot pressing is used, and a close interface may be formed in a process of compressing the electrode layers and the solid electrolyte layer.

Preparation of Anode Layer

Materials forming a first anode active material layer 22, such as an anode active material, a conducive agent, a binder, and a solid electrolyte are added to a polar solvent or a non-polar solvent to prepare a slurry. The slurry is coated and dried on an anode current collector 21 to prepare a first laminate. Subsequently, this dried first stack is pressed to prepare an anode layer 20. The pressing is, for example, roll pressed, flat pressed, or the like, but is not necessarily limited thereto, and any suitable pressing method may be used. The pressing operation may be omitted.

The anode layer includes a first anode active material layer including an anode current collector and an anode active material disposed on the anode current collector, wherein the anode active material includes a carbonaceous anode active material, a metal anode active material, a metalloid anode active material, or a combination thereof, wherein the carbonaceous anode active material includes amorphous carbon, crystalline carbon, or a combination thereof. In addition, the metal anode active material or the metalloid anode active material comprises gold (Au), platinum (Pt), palladium (Pd), silicon (Si), silver (Ag), aluminum (Al), bismuth (Bi), tin (Sn), zinc (Zn), or a combination thereof.

The anode layer may further include a second anode active material layer between the anode current collector and the first anode active material layer or between the solid electrolyte layer and the first anode active material layer, wherein the second anode active material layer is a metal layer including lithium metal or a lithium alloy.

Preparation of Cathode Layer

Materials forming a cathode active material layer 12, such as a cathode active material, a conducive agent, a binder, and a solid electrolyte are added to a non-polar solvent to prepare a slurry. The slurry is coated and dried on a cathode current collector 11 to prepare a laminate. The laminate is pressed to prepare a cathode layer 10. The pressing of the laminate may be performed by using a roll press, a flat press, or an isostatic press, but is not limited thereto, and any suitable pressing method may be used. The pressing operation may be omitted. In some embodiments, a mixture of materials forming the cathode active material layer 12 is densification-molded in the form of a pellet or extension-molded in the form of sheet to prepare a cathode layer 10. When the cathode layer 10 is prepared in this manner, a cathode current collector 11 may be omitted.

Preparation of All-Solid Secondary Battery

A solid electrolyte layer 30 is prepared by using, for example, the solid electrolyte formed of the sulfide-based electrolyte material described above. The solid electrolyte layer (30) is prepared by, for example, mixing, coating, drying, and pressing a sulfide-based solid electrolyte, a solvent, and a binder. In some embodiments, the sulfide-based solid electrolyte prepared by using the method of preparing a sulfide-based solid electrolyte may be vapor-deposited by using a common film-forming method such as an aerosol deposition method, a cold spray method, or a sputtering method to prepare a solid electrolyte. In some embodiments, the solid electrolyte may be prepared by pressing of a simple substance of the solid electrolyte particles.

Preparation of All-Solid Secondary Battery

The cathode layer 10, the anode layer 20, and the solid electrolyte layer 30 prepared by using the method are stacked to arrange the solid electrolyte layer 30 between the cathode layer 10 and the anode layer 20 and then pressed to prepare an all-solid secondary battery 1.

For example, the solid electrolyte layer 30 is disposed on the cathode layer to prepare a second stack. Subsequently, the anode layer 20 is disposed on the second stack to make the solid electrolyte layer 30 come in contact with the first anode active material layer to prepare a third stack, and the all-solid secondary battery is prepared by pressing the third stack. The pressing may be performed at a temperature, for example, in a range from room temperature to about 90° C., or about 20° C. to about 25° C. In an embodiment, the pressing may be performed at a high temperature of about 100° C. or higher. The pressing is performed, for example, for about 30 minutes or less, about 20 minutes or less, about 15 minutes or less, or about 10 minutes or less. The pressing is performed, for example, for about 1 millisecond (ms) to about 30 minutes, about 1 ms to about 20 minutes, about 1 ms to about 15 minutes, or about 1 ms to about 10 minutes. A pressing method is performed by using a roll press, a flat press, or an isostatic press, but is not limited thereto, and any suitable pressing method may be used. A pressure for the pressing may be, for example, about 500 MPa or less, about 450 MPa or less, about 400 MPa or less, about 350 MPa or less, about 300 MPa or less, about 250 MPa or less, about 200 MPa or less, about 150 MPa or less, or about 100 MPa or less. A pressure for the pressing may be, for example, about 50 MPa to about 500 MPa, about 50 MPa to about 480 MPa, about 50 MPa to about 450 MPa, about 50 MPa to about 400 MPa, about 50 MPa to about 350 MPa, about 50 MPa to about 300 MPa, about 50 MPa to about 250 MPa, about 50 MPa to about 200 MPa, about 50 MPa to about 150 MPa, or about 50 MPa to about 100 MPa. The solid electrolyte powder is sintered by the pressing and forms a single solid electrolyte.

As described, the structure and the preparation method of the all-solid secondary battery are examples of an embodiment, where members of the structure and the preparation process may be appropriately modified.

In the all-solid secondary battery according to an embodiment, the lower the interfacial resistance between the anode layer and the solid electrolyte layer, the greater the deposition and desorption of lithium metal may occur reversibly, and the greater the suppression of the formation of dendrites is possible, and thus a short circuit of the cell may be prevented and improved long service life characteristics may result.

The all-solid secondary battery according to an embodiment may be installed on a small-sized ITS or a large-sized electric vehicle, depending on a capacity and a size of the battery.

Hereinafter, a method for preparing a sulfide-based solid electrolyte according to an embodiment will be described in detail with reference to Examples and Comparative Examples. In addition, embodiments shown below are provided for illustrative purposes only, and are not limited thereto.

Preparation of Sulfide-Based Solid Electrolyte

Preparation Example 1: Preparation of $Li_{5.75}PS_{4.75}Cl_{1.25}$ $Li_2S$ powder, $P_2S_5$ powder, and LiCl (Acros Organic, 99%) powder were each weighed in a stoichiometric molar ratio to obtain a $Li_{5.75}PS_{4.75}Cl_{1.25}$ sulfide solid electrolyte, and then mixed to form a precursor mixture.

Mechanical milling was performed by pulverizing the precursor mixture with a zirconia ball (diameter: 10 mm) at a rotation speed of 800 rpm at 25° C. for about 30 mins under an argon gas atmosphere by using a high energy mill (Pulnerisette 7) equipment. The resultant was heat-treated at 300° C. for 12 hours under an Ar atmosphere, and then, subsequently, heat-treated at 400° C. to 600° C. for 12 hours. $Li_{5.75}PS_{4.75}Cl_{1.25}$ powder (D50: 3 m) was obtained by pulverizing the resultant.

Preparation Example 2: Preparation of $Li_{5.5}PS_{4.5}Cl_{0.75}Br_{0.75}$

A sulfide-based solid electrolyte, $Li_{5.5}PS_{4.5}Br_{0.75}Cl_{0.75}$ (D50: 3 μm), was prepared in the same manner as Preparation Example 1 except that LiBr was further added to a precursor mixture and amounts of $Li_2S$, $P_2S_5$, LiCl, and LiBr were stoichiometrically controlled to obtain $Li_{5.5}PS_{4.5}Cl_{0.75}Br_{0.75}$ when a precursor mixture was prepared.

Preparation Example 3

Except that amounts of $Li_2S$, $Na_2S$, $P_2S_5$, LiCl, and LiBr were changed and the heat treatment temperature was changed to obtain a sulfide-based solid electrolyte having a composition of Table 1, a sulfide-based solid electrolyte was prepared in the same manner as Example 1.

TABLE 1

| Sample | Sulfide-based solid electrolyte | Heat-treatment temperature (° C.) |
|---|---|---|
| 3-1 | $Li_{5.5}PS_{4.5}Cl_{0.25}Br_{1.25}$ | 425 |
| 3-2 | $Li_{5.45}PS_{4.5}Cl_{0.1}Br_{1.4}$ | 400 |
| 3-3 | $Li_{5.5}PS_{4.5}Cl_{0.25}Br_{1.25}$ | 425 |
| 3-4 | $Li_5Na_{0.05}PS_4Cl_{0.01}Br_{1.99}$ | 400 |
| 3-5 | $Li_{5.74}PS_{4.74}Cl_{0.01}Br_{1.25}$ | 425 |
| 3-5 | $Li_{5.45}K_{0.05}PS_{4.5}Cl_{0.25}Br_{1.25}$ | 425 |
| 3-6 | $Li_{5.45}K_{0.05}PS_{4.5}Cl_{0.1}Br_{1.4}$ | 400 |

Preparation Example 4

A cathode active material having an $aLi_2O$—$ZrO_2$ coating layer was prepared in the same manner disclosed in Korean Patent Publication No. 10-2016-0064942, which was prepared as follows.

$LiNi_{0.8}Co_{0.15}Mn_{0.05}O_2$(NCM) as a cathode active material, a lithium methoxide, a zirconium propoxide, ethanol, and ethyl acetoacetate were stirred and mixed for 30 minutes to prepare an alcohol solution of $aLi_2O$—$ZrO_2$ (where a=1) (a coating solution for coating $aLi_2O$—$ZrO_2$). In this regard, amounts of the lithium methoxide and zirconium propoxide were selected such that an amount of $aLi_2O$—$ZrO_2$ (where a=1) coated on the surface of the cathode active material was 0.5 mol %.

Then, the coating solution for coating $aLi_2O$—$ZrO_2$ was mixed with the cathode active material fine powder, and the mixed solution was heated to about 40° C. while stirring to evaporate a solvent, such as an alcohol, therefrom. In this regard, an ultrasonic wave was radiated to the mixed solution.

By following the processes above, a precursor for $aLi_2O$—$ZrO_2$ was supported on the surface of the cathode active material fine powder.

Also, the precursor for $aLi_2O$—$ZrO_2$ (where a=1) supported on the surface of the cathode active material particle was heat-treated at a temperature of 350° C. in an oxygen atmosphere for 1 hour. In the heat-treatment process, the precursor for $aLi_2O$—$ZrO_2$ (where a=1) present on the surface of the cathode active material was changed into $aLi_2O$—$ZrO_2$ (where a=1). An amount of $Li_2O$—$ZrO_2$ (LZO) is about 0.4 parts by weight based on 100 parts by weight of NCM.

By following the processes above, $LiNi_{0.8}Co_{0.15}Mn_{0.05}O_2$ (LZO-NCM) having an $aLi_2O$—$ZrO_2$ coating layer was obtained. In $aLi_2O$—$ZrO_2$, a is 1.

Preparation of All-Solid Secondary Battery

Example 1

A mixture obtained by mixing LZO-NCM obtained according to Preparation Example 4, which is a positive electrode active material, $Li_{5.75}PS_{4.75}Cl_{1.25}$ powder (D50=2 μm) obtained according to Preparation Example 1, carbon nanofibers, which are conductive materials, and polytetrafluoroethylene, which are binders, in a ratio of 85:15:0.2:1.2 is formed as a sheet to prepare a cathode sheet. The cathode sheet was compressed onto a cathode current collector formed of aluminum foil having a thickness of 18 μm, and placed in a batch-type oil chamber, and a WIP process to apply a pressure at 490 mPa was performed to form a compressed cathode layer.

Separately, an Ni foil (thickness: 10 μm) was prepared as an anode current collector. As an anode active material, silver (a primary particle size: 60 nm) and carbon black powder (a primary particle size: 35 nm) were prepared by mixing in a weight ratio of 25:75. In a container, 7 wt % of a polyvinylidene fluoride binder (#9300, Kureha Co.) with silver (a primary particle size: 60 nm) and carbon black powder (a primary particle size 35 nm) was put into N-methyl pyrrolidone (NMP) and stirred to prepare a slurry for forming an anode layer. The slurry for forming an anode layer was applied to the Ni foil by using a blade coater, dried in air at 80° C. for 20 minutes and vacuum dried at 100° C. for 12 hours to prepare an anode layer.

An acrylic resin as a binder (manufactured by Xeon) was added to $Li_{5.75}PS_{4.75}Cl_{1.25}$ powder (D50: 3 μm) obtained according to Preparation Example 1 to prepare a mixture. Here, a weight ratio of $Li_{5.75}PS_{4.75}Cl_{1.25}$ powder and the acrylic resin was 98.5:1.5. Octyl acetate as a solvent was added to the mixture and stirred to prepare a slurry for forming a solid electrolyte layer. The slurry for forming a solid electrolyte layer was applied on a polyethylene terephthalate (PET) film using an applicator, dried in air at 25° C. for 12 hours, and vacuum-dried at 70° C. for 2 hours to separate the solid electrolyte layer from the PET film, thereby obtaining a second solid electrolyte layer in the form of a sheet having a thickness of 60 μm.

A $Li_{5.5}PS_{4.5}Cl_{0.75}Br_{0.75}$ powder, obtained according to Preparation Example 2, and an acrylic resin (Xeon) as a binder were added in a weight ratio of 99:1 to prepare a mixture, and octyl acetate as a solvent was added to the mixture to obtain a composition for forming a first solid electrolyte layer. The composition for forming a first solid electrolyte layer was applied on a polyethylene terephthalate (PET) film using an applicator, dried in air at 25° C. for 12 hours, and vacuum-dried at 70° C. for 2 hours. A resultant was stacked on the anode layer, and WIP was applied with 30 MPa at 25° C. for 5 minutes to transfer the first solid electrolyte layer on the anode, thereby forming the first solid electrolyte layer having a thickness of 15 μm.

The cathode layer, the second solid electrolyte layer, the first solid electrolyte layer, and the anode layer obtained according to the processes above were sequentially stacked, and WIP was applied at 85° C. and 490 MPa for about 30 minutes to prepare an all-solid secondary battery. In the all-solid battery, after pressing, a thickness of the first solid electrolyte layer is 12 μm and a thickness of the second solid electrolyte layer is 45 μm. A thickness of the first solid electrolyte layer to a thickness of the second solid electrolyte layer is in a ratio of 1:3.75.

In Example 1, a difference in an amount of bromine in the first solid electrolyte and an amount of bromine in the second solid electrolyte is 0.75. Here, the amount of bromine is based on mole or atomic number. A difference between a ratio of Br, I, or a combination thereof s to Cl in the first solid electrolyte and a ratio of Br, I, or a combination thereof to Cl in the second solid electrolyte is 1.

Example 2

Except that an styrene-butadiene-styrene (SBS) block copolymer (a styrene-butadiene-styrene molar ratio=11:78:11) was used as a binder when the composition for forming a first solid electrolyte and the composition for forming a second solid electrolyte, a first solid electrolyte layer was prepared in the same manner as in Example 1, and an all solid battery was prepared by using the same. An average molecular weight of the block copolymer is about 100,000 Daltons.

In the all-solid battery, after pressing, a thickness of the first solid electrolyte layer is 12 μm and a thickness of the second solid electrolyte layer is 45 μm. A thickness of the first solid electrolyte layer to a thickness of the second solid electrolyte layer is in a ratio of 1:3.75.

Example 3-6

Except that a thickness ratio of a first solid electrolyte layer to a second solid electrolyte layer after pressing was changed as shown in Table 2 below, a first solid electrolyte layer, a second solid electrolyte layer, and an all-solid battery were prepared in the same manner as Example 1.

TABLE 2

| Sample | Thickness (d1) of first solid electrolyte layer | Thickness (d1) of second solid electrolyte layer | Thickness ratio (d1/d2) |
|---|---|---|---|
| Example 1 | 12 | 45 | 1:3.75 |
| Example 2 | 12 | 45 | 1:3.75 |
| Example 3 | 12 | 45 | 1:3.75 |
| Example 3 | 25 | 60 | 1:2.4 |
| Example 4 | 10 | 30 | 1:3 |
| Example 5 | 10 | 30 | 1:3 |
| Example 6 | 5 | 25 | 1:5 |

Comparative Example 1

A mixture, obtained by mixing LZO-NCM as a cathode active material obtained according to Preparation Example 4, $Li_{5.75}PS_{4.75}Cl_{1.25}$ powder (D50=2 μm) obtained according to Preparation Example 1, carbon nanofibers as conductive materials, and polytetrafluoroethylene as a binder were each mixed in a weight ratio of 85:15:0.2:1.2, was molded into a form of a sheet in a large size to prepare a cathode sheet. The cathode sheet was compressed onto a cathode current collector formed of aluminum foil having a thickness of 18 μm, and placed in a batch-type oil chamber, and a WIP press process to apply a pressure at 490 mPa was performed to form a compressed cathode layer.

Separately, an Ni foil (thickness: 10 μm) was prepared as an anode current collector. As an anode active material, silver (a primary particle size: 60 nm) and carbon black powder (a primary particle size: 35 nm) were prepared by mixing in a weight ratio of 25:75. In a container, 7 wt % of a polyvinylidene fluoride binder (#9300, Kureha Co.) with silver (a primary particle size: 60 nm) and carbon black powder (a primary particle size 35 nm) was put into N-methyl pyrrolidone (NMP) and stirred to prepare a slurry for forming an anode layer. The slurry for forming an anode layer was applied to the Ni foil by using a blade coater, dried in air at 80° C. for 20 minutes and vacuum dried at 100° C. for 12 hours to prepare an anode layer.

An acrylic resin as a binder (manufactured by Xeon) was added to $Li_{5.75}PS_{4.75}Cl_{1.25}$ powder (D50: 3 μm) obtained according to Preparation Example 1 to prepare a mixture. Here, a weight ratio of $Li_{5.75}PS_{4.75}Cl_{1.25}$ powder and the acrylic resin was 98.5:1.5. Octyl acetate was added to the mixture and stirred to prepare a slurry for forming a solid electrolyte layer. The slurry for forming a solid electrolyte layer was applied on a PET film by using screen printing, dried in air at 25° C. for 12 hours, and vacuum-dried at 70°

C. for 12 hours to separate a solid electrolyte layer from the PET film, thereby obtaining a solid electrolyte layer in the form of a sheet having a thickness of 60 μm.

The cathode layer, the solid electrolyte layer, and the anode layer obtained according to the processes above were sequentially stacked, and roll pressing was applied at 25° C. and 490 MPa for about 30 minutes to prepare an all-solid secondary battery. A thickness of the solid electrolyte layer after pressing in the all-solid battery is 45 μm.

Comparative Example 2

Except that $Li_{5.5}PS_{4.5}Cl_{0.75}Br_{0.75}$ obtained according to Preparation Example 2, instead of $Li_{5.75}PS_{4.75}Cl_{1.25}$ obtained according to Preparation Example 1, was used, an all-solid secondary battery was prepared in the same manner as Comparative Example 1.

Comparative Example 3

A mixture, obtained by mixing LZO-NCM as a cathode active material obtained according to Preparation Example 4, $Li_{5.75}PS_{4.75}Cl_{1.25}$ powder (D50=2 μm) obtained according to Preparation Example 1, carbon nanofibers as conductive materials, and polytetrafluoroethylene as a binder were each mixed in a weight ratio of 85:15:0.2:1.5. The mixture was molded into a form of a sheet to prepare a cathode sheet. The cathode sheet was compressed onto a cathode current collector formed of aluminum foil having a thickness of 18 μm, and placed in a batch-type oil chamber, and a WIP process to apply a pressure at 490 mPa was performed to form a compressed cathode layer.

Separately, an Ni foil (thickness: 10 μm) was prepared as an anode current collector. As an anode active material, silver (a primary particle size: 60 nm) and carbon black powder (a primary particle size: 35 nm) were prepared by mixing in a weight ratio of 25:75. In a container, 7 wt % of a polyvinylidene fluoride binder (#9300, Kureha Co.) with silver (a primary particle size: 60 nm) and carbon black powder (a primary particle size 35 nm) was put into N-methyl pyrrolidone (NMP) and stirred to prepare a slurry for forming an anode layer. The slurry for forming an anode layer was applied to the Ni foil by using a blade coater, dried in air at 80° C. for 20 minutes and vacuum dried at 100° C. for 12 hours to prepare an anode layer.

An acrylic resin as a binder (manufactured by Xeon) added to $Li_{5.5}PS_{4.5}Cl_{0.75}Br_{0.75}$ powder obtained according to Preparation Example 2 to prepare a mixture. Here, a weight ratio of $Li_{5.5}PS_{4.5}Cl_{0.75}Br_{0.75}$ powder and the acrylic resin was 98.5:1.5. Octyl acetate was added to the mixture and stirred to prepare a slurry for forming a solid electrolyte layer. The slurry for forming a solid electrolyte layer was applied on a PET film by using screen printing, dried in air at 25° C. for 12 hours, and vacuum-dried at 70° C. for 2 hours to obtain a solid electrolyte layer in the form of a sheet having a thickness of 60 μm.

A $Li_{5.75}PS_{4.75}Cl_{1.25}$ powder (D50: 3 μm), obtained according to Preparation Example 1, and an SBS block copolymer (a styrene-butadiene-styrene molar ratio=11:78:11) in a weight ratio of 98.5:1.5 to prepare a mixture, and octyl acetate as a solvent was added to the mixture obtain a composition for forming a first solid electrolyte layer. The composition for forming a first solid electrolyte layer was coated on the anode layer and dried to form a first solid electrolyte layer.

The cathode layer, the second solid electrolyte layer, the first solid electrolyte layer, and the anode layer obtained according to the processes above were sequentially stacked, and roll pressing was applied at 25° C. and 490 MPa for about 30 minutes to prepare an all-solid secondary battery. A PET film was removed from the second solid electrolyte layer.

In the all-solid battery, after pressing, a thickness of the first solid electrolyte layer is 12 μm and a thickness of the second solid electrolyte layer is 45 μm.

Comparative Example 4

Except that $Li_{5.75}PS_{4.75}Cl_{1.25}$ was used when a first solid electrolyte layer and a second solid electrolyte layer were formed, the first solid electrolyte layer, the second solid electrolyte layer, and an all-solid secondary battery including the same were prepared in the same manner as Example 1.

Comparative Example 5

Except that $Li_{5.75}PS_{4.75}Cl_{1.25}$ was used when a first solid electrolyte layer and a second solid electrolyte layer were formed, the first solid electrolyte layer, the second solid electrolyte layer, and an all-solid secondary battery including the same were prepared in the same manner as Example 1.

Evaluation Example 1: Measurement of Ion Conductivity

Powders of the solid electrolytes prepared in Preparation Example 1 and 2 were placed in a mold having a diameter of 10 mm and pressed at a pressure of 350 mPa to form a pellet. A sample for measuring the ion conductivity was prepared by coating an indium (In) thin film on both sides of the pellet. For the prepared sample, the impedance was measured by using an AUTOLAB PGSTAT30 (Metrohm Autolab Co. Ltd.) potentiostat to prepare a Nyquist plot, from which an ion conductivity was measured at 25° C.

Measured ion conductivities are shown in Table 3.

TABLE 3

| Sample | Ion conductivity (mS/cm) at 25° C. | Ion conductivity (mS/cm) at 45° C. | Ion conductivity (mS/cm) at 60° C. |
|---|---|---|---|
| Preparation Example 1 | 6.5 | 13.0 | 19.5 |
| Preparation Example 2 | 2.5 | 5.8 | 9.0 |
| Ion conductivity difference[1] | 4 | 7.2 | 10.5 |
| Example 1 First solid electrolyte layer | 0.5 | 1.0 | 1.6 |
| Second solid electrolyte layer | 0.3 | 0.7 | 1.2 |

[1]A difference in ion conductivity between the solid electrolyte of Preparation Example 1 and the solid electrolyte of Preparation Example 2. The ion conductivity of each solid electrolyte layer was measured by stacking 10 sheets and then pressing the same with pressure of about 4 tonne per square centimeter (ton/cm$^2$).

Evaluation Example 2: Capacity Retention Rate

Example 2, Example 3, Comparative Example 1, and Comparative Example 2

The charge/discharge characteristics of the all-solid secondary batteries of Example 2, Example 3, Comparative Example 1, and Comparative Example 2 were evaluated by the following charge-discharge test. The charge/discharge test was performed by placing the all-solid secondary battery in a constant temperature bath at 45° C.

After charging at a rate of 0.1 C (C-rate) until the voltage became 4.25 V (vs. Li), cut-off was performed at a rate of 0.05 C while 4.25 V (vs. Li) was maintained. Subsequently, discharge was performed at a rate of 0.1 C (C-rate) until the voltage became 2.5 V (vs. Li) during the discharge (forming step, the 1st cycle). After a charging rate was fixed at 0.1 C, the discharge rate was changed to 0.33 C and 1.0 C, and the charge/discharge process was performed twice more to complete the forming process. Charging of the all-solid secondary battery was processed by using the same temperature at a rate of 0.33 C until the voltage reached 4.25 V (vs. Li), and then discharge was performed at a rate of 0.33 C until the voltage reached 2.5 V (vs. Li). The charge/discharge cycle was repeatedly performed until the total number of cycles was 300. Results are shown in FIG. 3.

Figure 3:
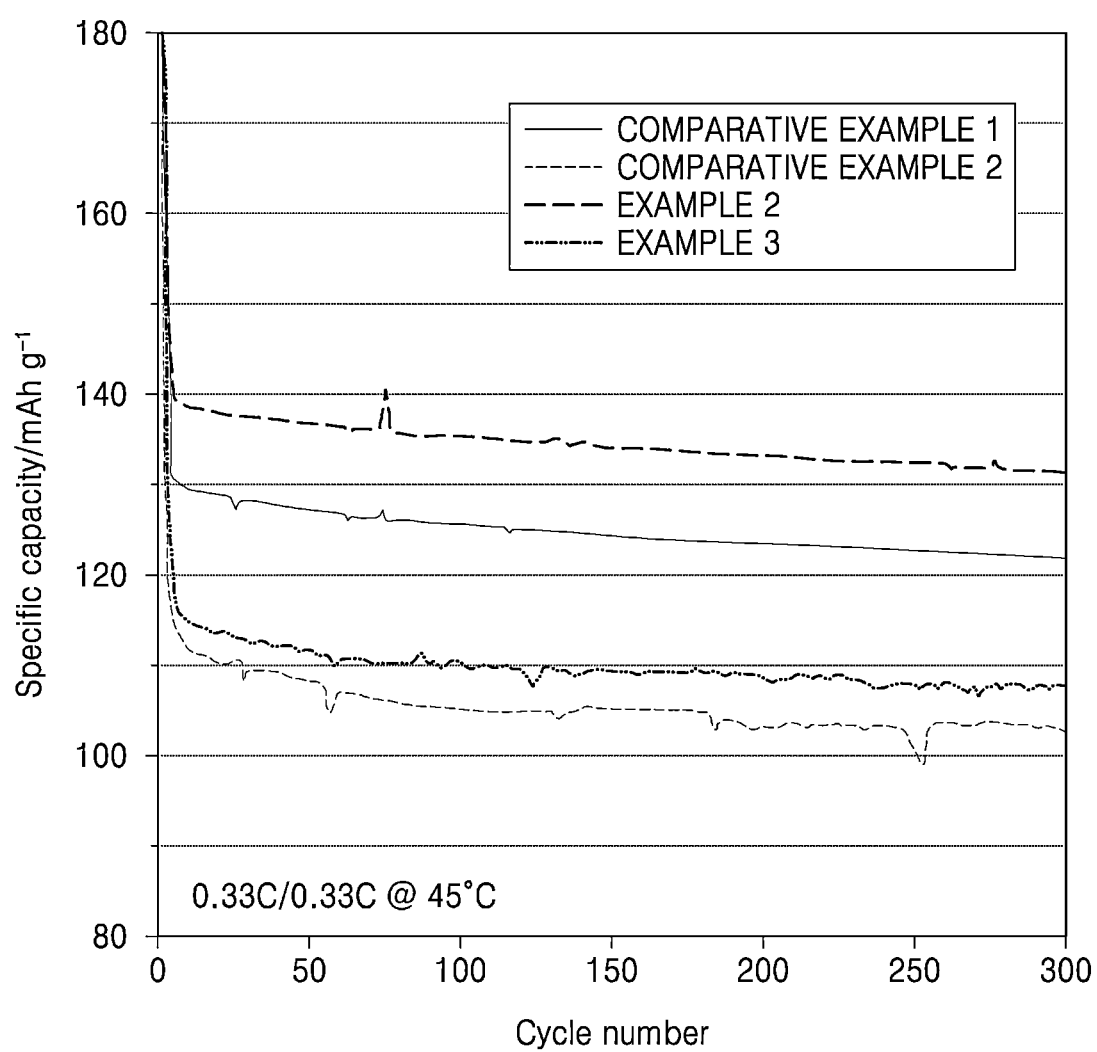
FIG. 3 is a graph of specific capacity (milliampere hours per gram (mAh g$^{-1}$)) versus the number of charge/discharge cycles (Cycle number) and illustrates capacity retention of the all-solid secondary batteries of Examples 2 and 3 and Comparative Examples 1 and 2.

Referring to FIG. 3, the all-solid secondary battery of Examples 2 and 3 were able to obtain a high capacity as a result of evaluating charge/discharge cycle characteristics at 0.33 C, and had an improved capacity retention rate compared to Comparative Examples 1 and 2.

Example 2, Comparative Examples 1, 2, 4 and 5

Figure 8:
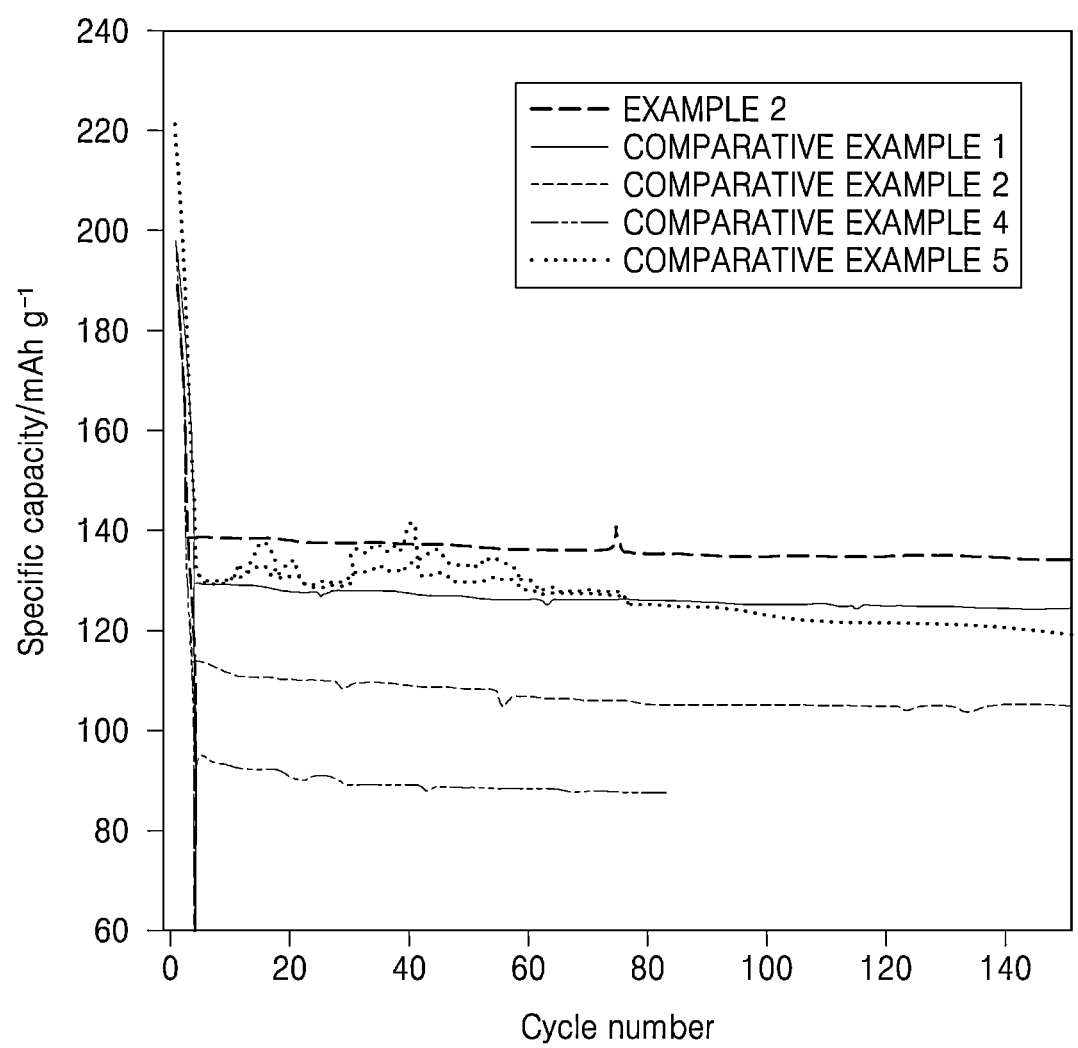
FIG. 8 is a graph of specific capacity (milliampere hours per gram (mAh g–1)) versus the number of charge/discharge cycles (Cycle number) and illustrates capacity retention of the all-solid secondary batteries of Example 2 and Comparative Examples 1, 2, 4, and 5.

For the all-solid secondary batteries of Example 2, Comparative Examples 1, 2, 4 and 5, charge/discharge cycle characteristics at 0.33 C were evaluated in the same manner as a method for evaluating charge/discharge cycle characteristics of the all-solid secondary battery of Example 1, and the result is shown in FIG. 8. The charge/discharge cycle was repeatedly performed 150 times as shown in FIG. 8.

Referring to FIG. 8, the solid secondary battery of Example 2 had a reversible capacity of about 140 mAh/g, and the capacity retention rate after 150 times was 96%, which increased compared to the capacity retention rate after 150 times, and is 95.3% of Comparative Example 1. In addition, as shown in FIG. 8, the all-solid secondary battery of Example 2 had an improved capacity retention rate compared to the all-solid secondary batteries of Comparative Examples 2, 4, and 5.

Evaluation Example 3: Rate Characteristics

Charge/discharge characteristics of the all-solid-state secondary batteries of Examples 1 to 3 and Comparative Examples 1 to 3 were evaluated by the following charge/discharge test. The charge/discharge test was performed by placing the all-solid secondary battery in a thermostatic bath at 45° C.

After charging with a constant current until the voltage became 4.25 V (vs. Li) at a rate of 0.1 C (C-rate), the voltage was maintained until a current reached 1/50 C. And then, discharge at a rate of 0.2 C was performed until the voltage reached 2.5 V (vs. Li). Afterwards, the test rested for 10 minutes. Subsequently, in the second and subsequent cycles, each all-solid state secondary battery is charged with a constant current until the voltage reached 4.25 V (vs. Li) at a rate of 0.1 C at the same temperature and then the voltage was maintained until the current reached 1/50 C. And then, discharge at a rate of 0.33 C or 1.0 C was performed until the voltage became 2.5 V (vs. Li). Some of the results are shown in FIGS. 1A to 1C, FIG. 2 and Table 4.

Rate capability was evaluated according to Equation 1 below, and evaluation results are shown in Table 4. Charge/discharge efficiency at 1.0 C is shown in Table 4.

Figure 1B:
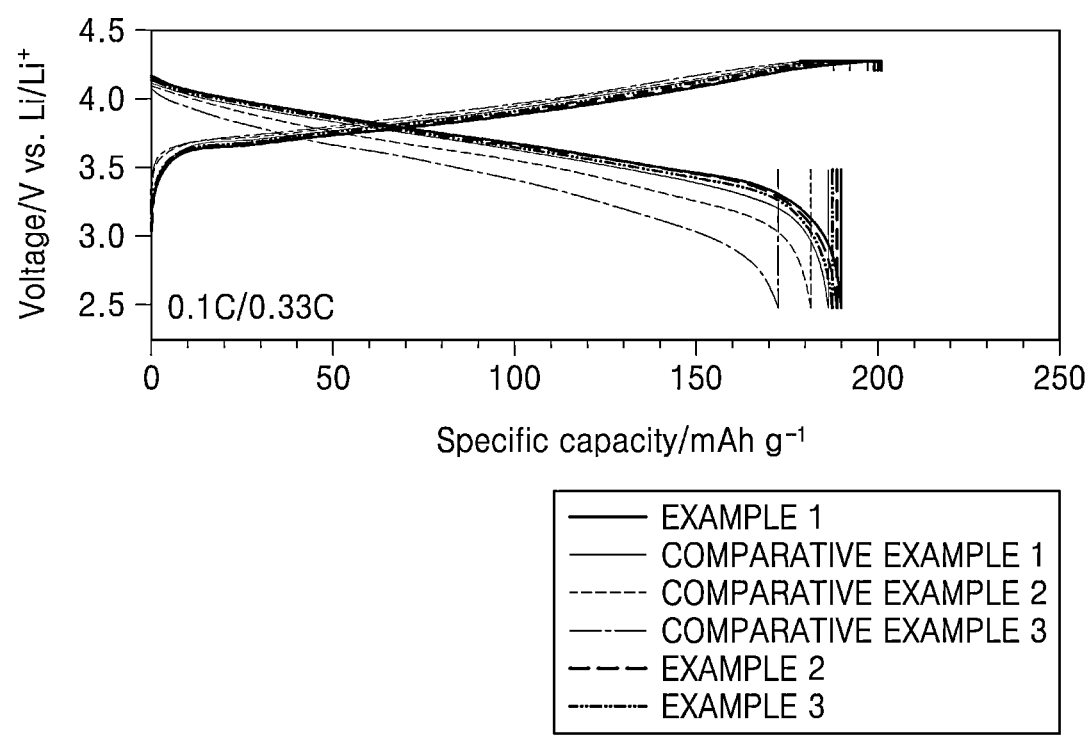
Figure 1C:
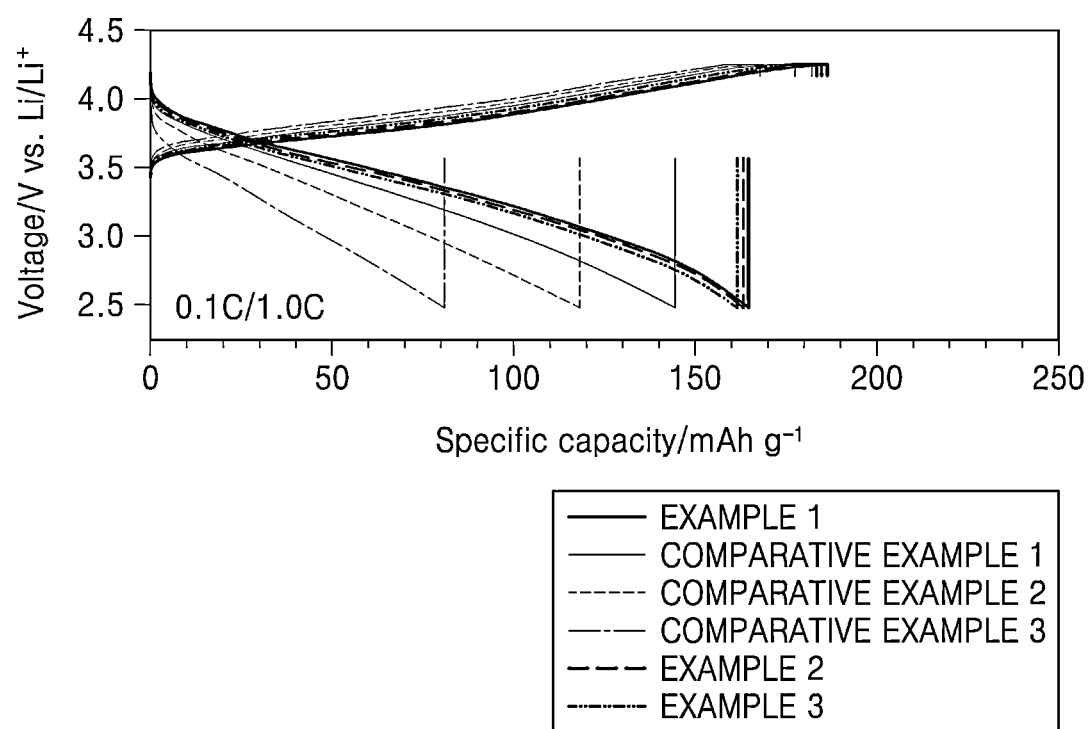
Figure 2:
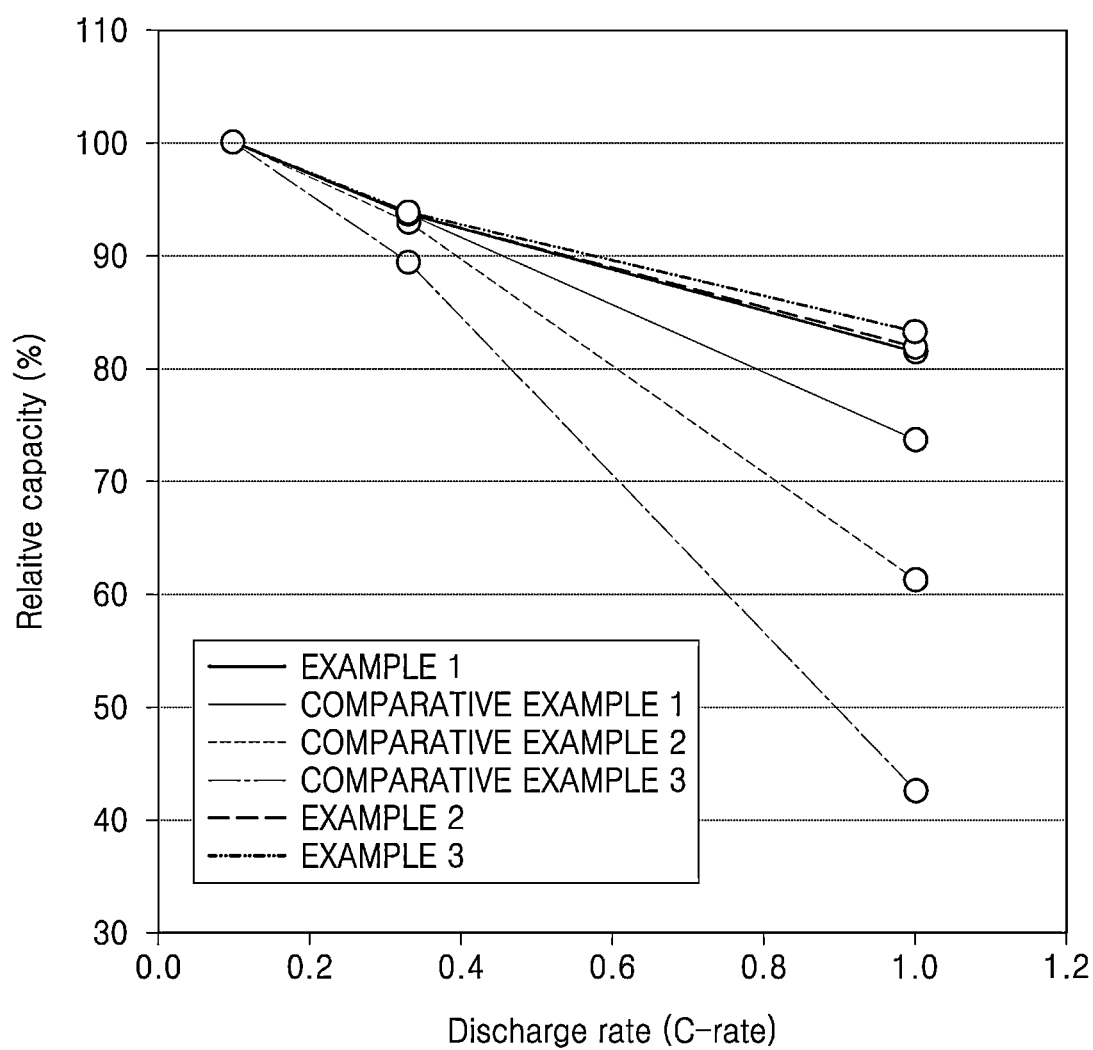
FIG. 2 is a graph of capacity (%) versus discharge rate (C-rate), and illustrates capacity retention of the all-solid secondary batteries of Examples 1 to 3 and Comparative Examples 1 to 3 at various rates.

Voltage changes according to specific capacities are shown in FIGS. 1A to 1C, and relative capacity changes according to charge rates are shown in FIG. 2.

$$\text{Rate capability (\%)} = [(\text{discharge capacity of 1.0 C})/(\text{discharge capacity of 0.33 C})] \times 100\% \quad \text{Equation 1}$$

TABLE 4

| Sample | Charge/discharge rate (%) at 1.0 C | Rate capability (%) |
|---|---|---|
| Example 1 | 164.68 | 89.08 |
| Example 2 | 162.77 | 88.13 |
| Example 3 | 161.80 | 87.72 |
| Comparative Example 1 | 144.45 | 78.66 |
| Comparative Example 2 | 117.83 | 65.90 |
| Comparative Example 3 | 80.84 | 47.60 |
| Comparative Example 4 | 147.41 | 79.86 |
| Comparative Example 5 | 95.11 | 54.45 |

The all-solid secondary batteries of Examples 1 to 3, as shown in FIGS. 1A to 1C, exhibited high reversible capacities at 0.1 C, 0.33 C, and 1.0 C-rate. In addition, the all-solid secondary battery of Examples 1 to 3 had increased rate capability compared to the all-solid secondary battery of Comparative Examples 1 to 5 as shown Table 4. This result is obtained as interface resistance between the anode layer and the solid electrolyte layer of the all-solid secondary batteries of Examples 1 to 3 was reduced, thereby increasing reversible capacities at high rate. In addition, as shown in FIG. 2, the all-solid secondary batteries of Examples 1 to 3 had a 0.33 C to 0.1 C discharge capacity ratio and a 1.0 C to 0.1 C discharge capacity ratio, which were increased compared to the all-solid secondary batteries of Comparative Example 1 to 3.

Example 2 and Comparative Examples 4-5

Charge/discharge characteristics of the all-solid secondary batteries of Example 2 and Comparative Examples 4-5 were tested in the same manner as the method of evaluating charge/discharge characteristics of the all-solid secondary battery of Example 1.

Figure 4:
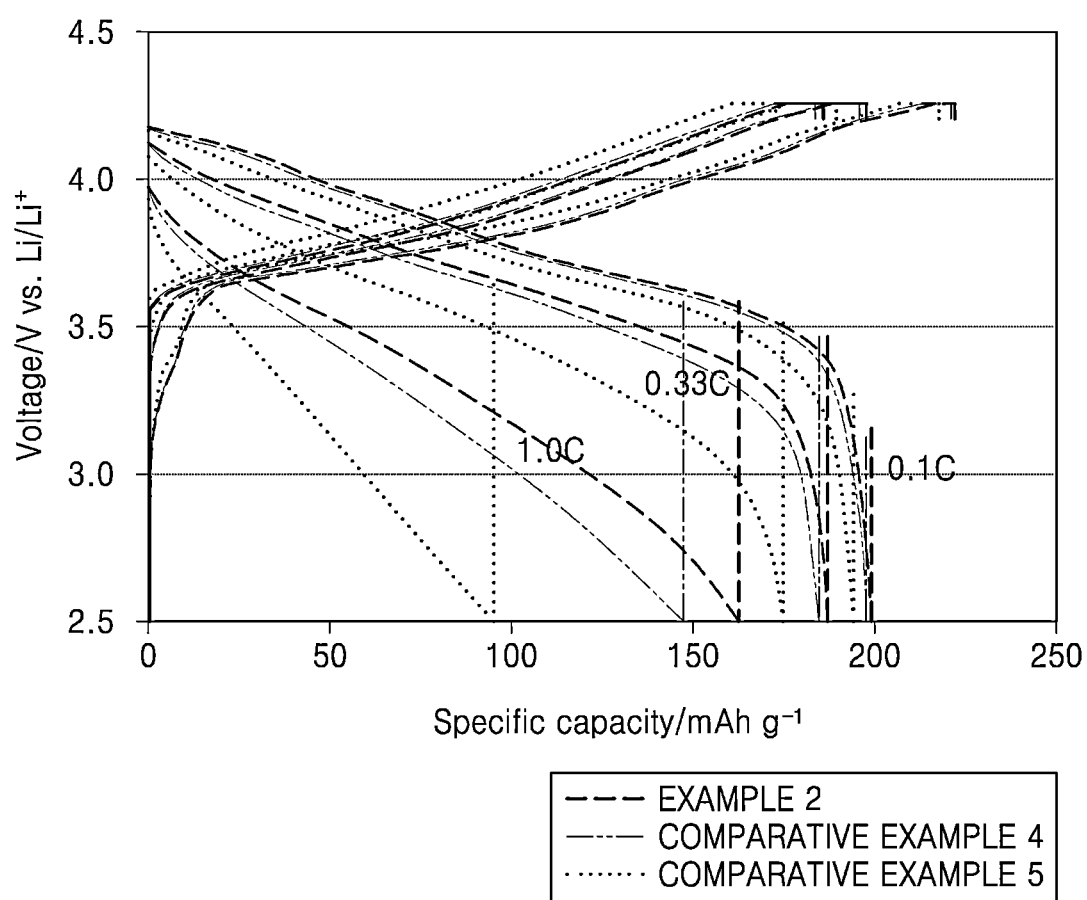
FIG. 4 is a graph of voltage (V vs. Li/Li$^+$) versus specific capacity (milliampere hours per gram (mAh g$^{-1}$)), and illustrates voltage of the all-solid secondary batteries of Example 2 and Comparative Examples 4 and 5 when discharged at various rates.
Figure 5:
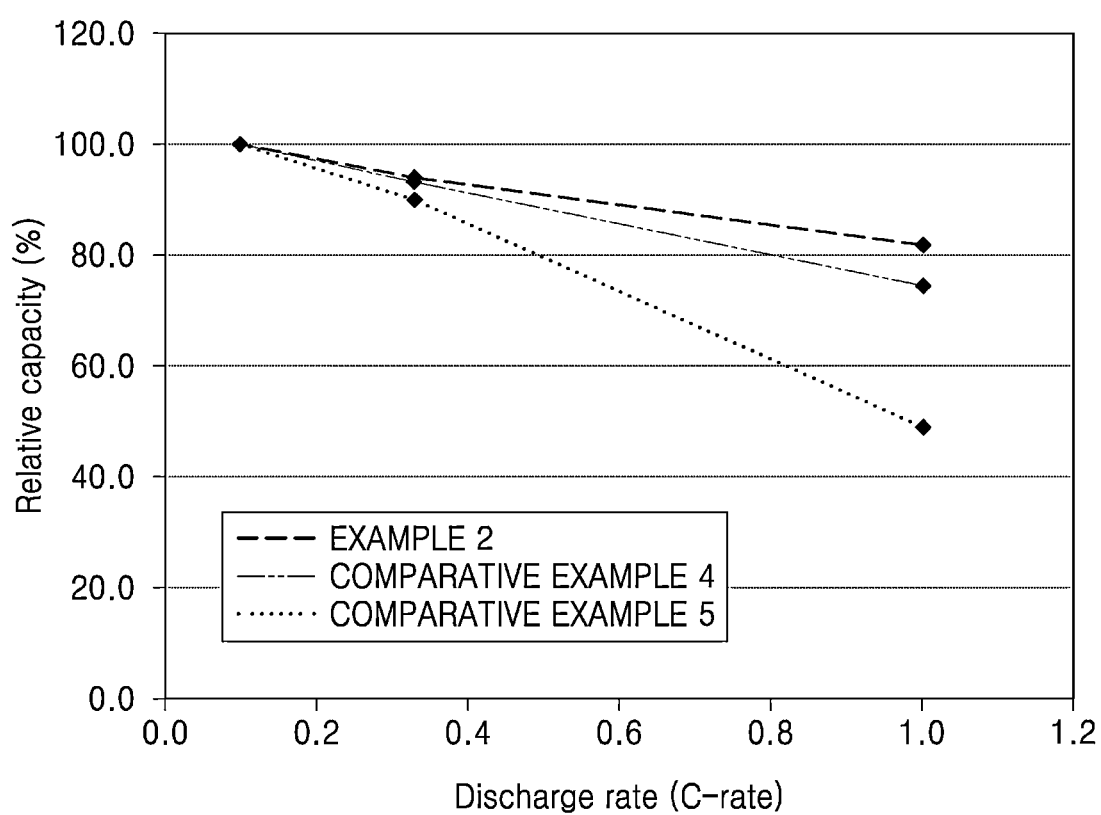
FIG. 5 is a graph of capacity (%) versus discharge rate (C-rate) and illustrates changes in capacity retention of the all-solid secondary batteries of Example 2 and Comparative Examples 4 and 5.

Evaluation results of life characteristics are shown in FIGS. 4-5. Voltage changes according to specific capacities are shown in FIG. 4, and relative capacity characteristics according to discharge rates are shown in FIG. 5.

As shown FIGS. 4 and 5, the all-solid secondary batteries have reduced interface resistance compared to Comparative Examples 4 and 5 and thus has improved capacity characteristics at a high rate.

Example 3

Rate characteristics of the all-solid secondary battery of Example 3 were evaluated in the same manner as the method of evaluating rate characteristics of the all-solid secondary battery of Example 1.

Figure 6:
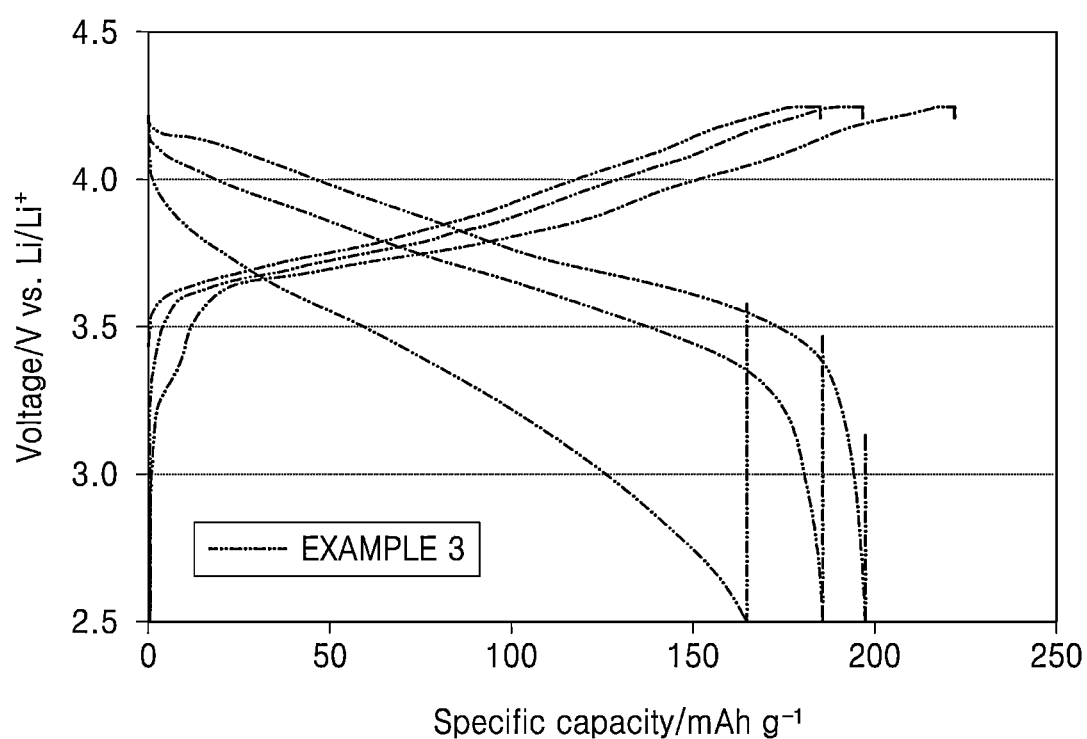
FIG. 6 is a graph of voltage (V vs. Li/Li$^+$) versus specific capacity (milliampere hours per gram (mAh g$^{-1}$)), and illustrates voltage changes of the all-solid secondary battery of Example 3.
Figure 7:
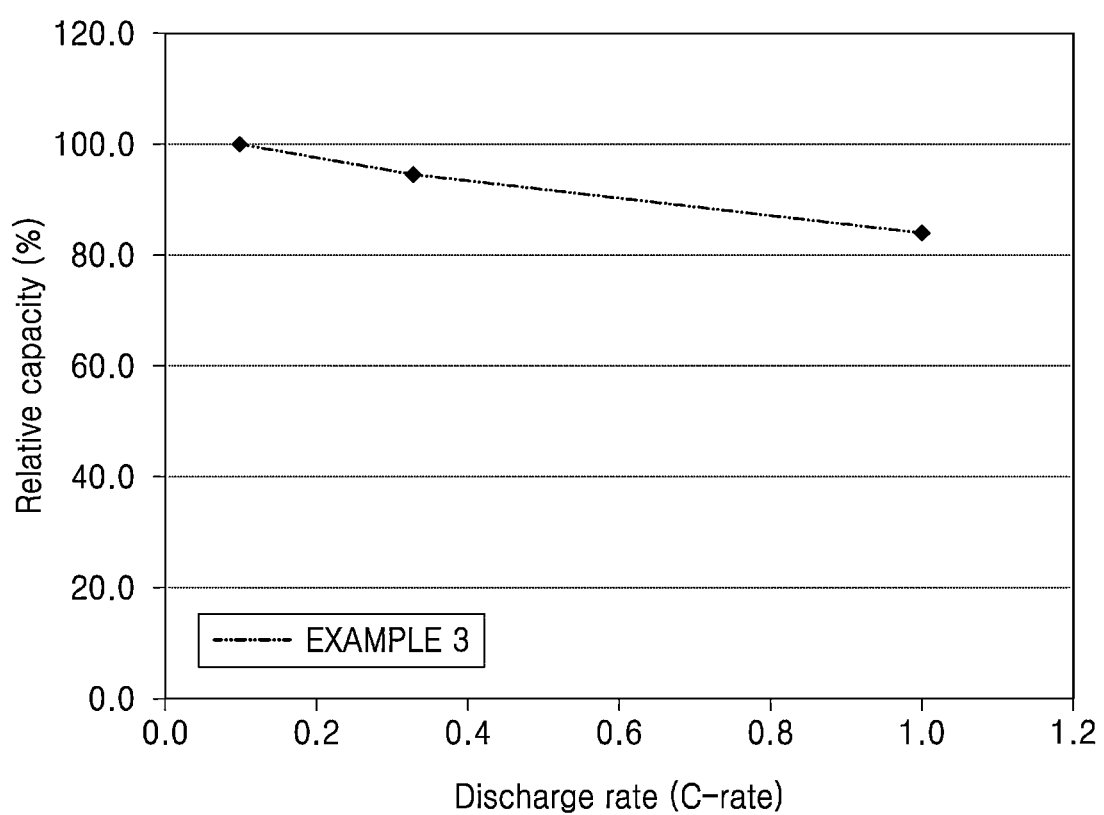
FIG. 7 is a graph of capacity (%) versus discharge rate (C-rate) and illustrates changes in capacity retention of the all-solid secondary battery of Example 3.

Results of evaluating rate characteristics are shown in FIGS. 6 and 7. Voltage changes according to specific capacities are shown in FIG. 6 and relative capacity characteristics according to discharge rates are shown in FIG. 7.

As shown in FIGS. 6 and 7, the all-solid secondary battery of Example 3 has good characteristics of interface resistance and capacity.

Evaluation Example 4: SEM-EDAX Analysis

SEM-EDAX analysis of the solid secondary battery prepared according to Example 2 was performed to investigate a lamination state and composition of each layer. SEM-EDAX analysis was performed by using S-4700 (available from Hitachi). FIG. 9 is an SEM analysis image, and FIGS. 10A to 10F are EDAX analysis images allowing each component of carbon, silver, phosphorus, sulfur, chlorine, and bromine to be identified.

Referring to FIG. 9, the all-solid secondary battery of Example 2 was confirmed to have a structure in which the first solid electrolyte layer and the second solid electrolyte layer were stacked. In addition, referring to FIG. 10A to 10F, element components, existing in the first solid electrolyte layer, close to the anode, and the second solid electrolyte layer close to the cathode were identified.

Evaluation Example 5: Density

Sheet densities, after pressing, of the first solid electrolyte layer and the second solid electrolyte layer obtained in Example 1 and a theoretical density of the sulfide-based solid electrolyte powder of Preparation Examples 1 and 2 were investigated and are shown in Table 5 below, and sheet densities, after pressing, of the first solid electrolyte layer and the second solid electrolyte layer obtained Example 1 are shown in Table 6.

TABLE 5

| Sample | Composition | Theoretical density (g/cm$^3$) |
|---|---|---|
| Solid electrolyte of Preparation Example 1 (D50: 3 μm) | $Li_{5.5}PS_{4.5}Br_{0.75}Cl_{0.75}$ | 1.95 |
| Solid electrolyte of Preparation Example 2 (D50: 3 μm) | $Li_{5.75}PS_{4.75}Cl_{1.25}$ | 1.76 |

TABLE 6

| Sample | Composition | Sheet density (g/cm$^3$) |
|---|---|---|
| First solid electrolyte layer of Example 1 | $Li_{5.5}PS_{4.5}Br_{0.75}Cl_{0.75}$ + acrylic resin | 1.70 to 1.75 |
| Second solid electrolyte layer of Example 1 | $Li_{5.75}PS_{4.75}Cl_{1.25}$ + acrylic resin | 1.55 to 1.60 |

Referring to Tables 5 and 6, a theoretical density of the solid electrolytes of Preparation Examples 1 and 2 and sheet densities of the first solid electrolyte layer and the second solid electrolyte layer were excellent. While embodiments have been described above, it is to be understood that the present disclosure is not limited to the disclosed embodiments but is intended to cover various modifications and equivalent arrangements included within the spirt and scope of the following claims, detailed explanation, and appended figures.

According to an aspect, interface resistance between the cathode layer and the solid electrolyte layer is reduced, and movement of lithium ions at a high rate is increased. As a result, an all-solid secondary battery having improved reversible capacity and capacity retention rate may be prepared.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
a solid electrolyte layer disposed between an anode layer and a cathode layer, wherein the solid electrolyte layer comprises
a first solid electrolyte layer comprising a first solid electrolyte, and
a second solid electrolyte layer comprising a second solid electrolyte, wherein
the first solid electrolyte layer is disposed proximate to the anode layer,
the second solid electrolyte layer is disposed proximate to the cathode layer, and
wherein the second solid electrolyte has an argyrodite crystal structure represented by Formula 2, $$Li_aM_xPS_bCl_d \qquad \text{Formula 2}$$

wherein, in Formula 2,
M is Na, K, Fe, Mg, Ca, Ag, Cu, Zr, Zn, or a combination thereof; and $0 \leq x \leq 0.07$, $5 \leq a \leq 6$, $4 \leq b \leq 6$, $0 < d \leq 2$, and $5 \leq (a+x) \leq 6$.

2. The all-solid secondary battery of claim 1, wherein the first solid electrolyte layer is disposed directly on the anode layer, and the second solid electrolyte layer is disposed directly on the cathode layer.

3. The all-solid secondary battery of claim 1, wherein the first solid electrolyte is a sulfide solid electrolyte having an argyrodite crystal structure.

4. The all-solid secondary battery of claim 1, wherein
the first solid electrolyte has an argyrodite crystal structure and comprises Cl and Br, I, or a combination thereof, and
an amount of the Br, I, or a combination thereof in the first solid electrolyte is greater than an amount of Br, I, or a combination thereof in the second solid electrolyte.

5. The all-secondary battery of claim 1,
wherein the first solid electrolyte layer comprises the first solid electrolyte and the second solid electrolyte layer comprises the second solid electrolyte,
wherein the first solid electrolyte has an argyrodite crystal structure and comprises Cl and Br, I, or a combination thereof, and
wherein a ratio of the Br, I, or a combination thereof to Cl of the first solid electrolyte is greater than a ratio of the Br, I, or a combination thereof to Cl of the second solid electrolyte.

6. The all-solid secondary battery of claim 1, wherein the first solid electrolyte has an argyrodite crystal structure represented by Formula 1, $$Li_aM_xPS_bX_cCl_d \qquad \text{Formula 1}$$

wherein, in Formula 1,
M is Na, K, Fe, Mg, Ca, Ag, Cu, Zr, Zn, or a combination thereof;
X is Br, I, or a combination thereof; and
$0 \leq x \leq 0.07$, $5 \leq a \leq 6$, $4 \leq b \leq 6$, $c > 0$, $d > 0$, $0 < (c+d) \leq 2$, and $5 \leq (a+x) \leq 6$.

7. The all-solid secondary battery of claim 6, wherein first solid electrolyte comprising Formula 1 is represented by Formula 3, $$Li_aM_xPS_bBr_cCl_d \qquad \text{Formula 3}$$

wherein, in Formula 3,
M is Na, K, Fe, Mg, Ca, Ag, Cu, Zr, Zn, or a combination thereof, and
$0 \leq x \leq 0.07$, $5 \leq a \leq 6$, $4 \leq b \leq 6$, $c > 0$, $d > 0$, $0 < (c+d) \leq 2$, and $5 \leq (a+x) \leq 6$.

8. The all-solid secondary battery of claim 7, wherein $0 \leq x \leq 0.05$.

9. The all-solid secondary battery of claim 6, wherein the first solid electrolyte comprising Formula 1 is represented by Formula 4, $$(Li_{1-x1}M_{x1})_{7-y}PS_{6-y}(Br_{1-x2}Cl_{x2})_y \qquad \text{Formula 4}$$

wherein, in Formula 4,
M is Na, K, Fe, Mg, Ca, Ag, Cu, Zr, Zn, or a combination thereof, and
$0 \leq x1 < 1$, $0 < x2 < 1$, and $0 \leq y \leq 2$.

10. The all-solid secondary battery of claim 6, wherein a compound represented by Formula 1 is $Li_{5.5}PS_{4.5}Cl_{0.75}Br_{0.75}$, $Li_{5.5}PS_{4.5}Cl_{0.25}Br_{1.25}$, $Li_{5.5}PS_{4.5}Cl_{1.25}Br_{0.25}$, $Li_{5.5}PS_{4.5}Cl_{0.1}Br_{1.4}$, $Li_{5.45}Na_{0.05}PS_{4.5}Cl_{0.25}Br_{1.25}$, $Li_{5.5}PS_{4.5}Cl_{0.25}Br_{1.25}$, $Li_{5.45}Na_{0.05}PS_{4.5}Cl_{0.1}Br_{1.4}$, $Li_{5.45}Na_{0.05}PS_{4.5}Cl_{0.1}Br_{1.4}$, $Li_5Na_{0.05}PS_4Cl_{0.01}Br_{1.99}$, $Li_{5.74}PS_{4.74}Cl_{0.01}Br_{1.25}$, $Li_5PS_4Cl_{0.01}Br_{1.99}$, $Li_{5.45}K_{0.05}PS_{4.5}Cl_{0.25}Br_{1.25}$, $Li_{5.45}K_{0.05}PS_{4.5}Cl_{0.1}Br_{1.4}$, $Li_{5.45}K_{0.05}PS_{4.5}Cl_{0.1}Br_{1.4}$, $Li_5K_{0.05}PS_4Cl_{0.01}Br_{1.99}$, or a combination thereof.

11. The all-solid secondary battery of claim 1, wherein the difference in the lithium ion conductivity of the first solid electrolyte and the lithium ion conductivity of the second solid electrolyte is about 2 millisiemens per centimeter to about 20 millisiemens per centimeter.

12. The all-solid secondary battery of claim 1,
wherein, a ratio of a packing density to a true density in each of the first solid electrolyte layer and the second solid electrolyte layer is about 0.6:1 or more,
the ratio of the packing density to the true density of the first solid electrolyte layer is less than a ratio of packing density to the true density of the second solid electrolyte layer, and
a difference between the ratio of the packing density to the true density of the first solid electrolyte layer and the ratio of the packing density to the true density of the second solid electrolyte layer is about 0.02:1 to about 0.05:1.

13. The all-solid secondary battery of claim 1, wherein a ratio of a thickness of the first solid electrolyte layer to a thickness of the second solid electrolyte layer is about 1:1 to about 1:10.

14. The all-solid secondary battery of claim 1, wherein
a thickness of the second solid electrolyte layer is greater than a thickness of the first solid electrolyte, and
a thickness of the first solid electrolyte layer is about 1 micrometer to about 35 micrometers and a thickness of the second solid electrolyte layer is about 10 micrometers to about 60 micrometers.

15. The all-solid secondary battery of claim 1, wherein a total thickness of the solid electrolyte layer is about 11 micrometers to about 200 micrometers.

16. The all-solid secondary battery of claim 1, wherein the second solid electrolyte comprises $Li_{5.75}PS_{4.75}Cl_{1.25}$, $Li_{5.75}PS_{4.5}Cl_{1.5}$, $Li_{5.5}PS_{4.5}Cl_{1.5}$, $Li_{5.45}Na_{0.05}PS_{4.5}Cl_{1.5}$, $Li_{5.45}K_{0.05}PS_{4.5}Cl_{1.5}$, $Li_{5.74}PS_{4.74}Cl_{1.26}$, $Li_5Na_{0.05}PS_4Cl_2$, $Li_5K_{0.05}PS_4Cl_2$, $Li_{5.8}PS_{4.8}Cl_{1.2}$, $Li_{5.7}Na_{0.05}PS_{4.75}Cl_{1.25}$, $Li_{5.7}Cu_{0.05}PS_{4.75}Cl_{1.25}$, $Li_{5.65}Cu_{0.1}PS_{4.75}Cl_{1.25}$, or a combination thereof.

17. The all-solid secondary battery of claim 1, wherein an ion conductivity of both the first solid electrolyte and the second solid electrolyte are about 1 millisiemens per centimeter or greater at 25° C.

18. The all-solid secondary battery of claim 1, wherein an ion conductivity of the first solid electrolyte is about 3 millisiemens per centimeter to about 7 millisiemens per centimeter at 25° C., about 10 millisiemens per centimeter to about 15 millisiemens per centimeter at 45° C., or about 16 millisiemens per centimeter to about 20 millisiemens per centimeter at 60° C.

19. The all-solid secondary battery of claim 1, wherein an ion conductivity of the second solid electrolyte is about 1 millisiemen per centimeter to about 5 millisiemens per centimeter at 25° C., about 3 millisiemens per centimeter to about 8 millisiemens per centimeter at 45° C., or about 5 millisiemens per centimeter to about 12 millisiemens per centimeter at 60° C.

20. The all-solid secondary battery of claim 1,
wherein the first solid electrolyte layer and the second solid electrolyte layer each independently comprises a binder, and
wherein the binder comprises styrene-butadiene-styrene copolymer, acrylic resin, styrene-butadiene rubber, polytetrafluoroethylene, polyvinylidene fluoride, polyethylene, a vinylidene fluoride/hexafluoropropylene copolymer, polyacrylonitrile, polymethyl methacrylate, or a combination thereof.

21. The all-solid secondary battery of claim 20, wherein an amount of the binder in the first solid electrolyte layer is less than an amount of a binder in the second solid electrolyte layer, wherein a difference between the amount of the binder in the first solid electrolyte and the amount of the binder in the second solid electrolyte layer is about 0.5 weight percent to about 1.5 weight percent.

22. The all-solid secondary battery of claim 21, wherein
an amount of the binder in the first solid electrolyte layer is about 0.5 part by weight to about 1.5 parts by weight or less, based on 100 parts by weight of a total weight of the first solid electrolyte comprising the binder, and
an amount of the binder in the second solid electrolyte layer is about 1 part by weight to about 2 parts by weight, based on 100 parts by weight of a total weight of the second solid electrolyte comprising the binder.

23. The all-solid secondary battery of claim 1, wherein the anode layer comprises a first anode active material layer comprising an anode current collector and an anode active material disposed on the anode current collector,
wherein the anode active material comprises a carbonaceous anode active material, a metal-containing anode active material, a metalloid-containing anode active material, or a combination thereof.

24. The all-solid secondary battery of claim 23, wherein the carbonaceous anode active material comprises amorphous carbon, crystalline carbon, or a combination thereof, and
the metal-containing anode active material or the metalloid-containing anode active material comprises gold, platinum, palladium, silicon, silver, aluminum, bismuth, tin, zinc, or a combination thereof.

25. The all-solid secondary battery of claim 23, further comprising a second anode active material layer disposed between the anode current collector and the first anode active material layer or between the solid electrolyte layer and the first anode active material layer,
wherein the second anode active material layer is a metal layer comprising lithium metal or a lithium alloy.

26. The all-solid secondary battery of claim 1, wherein the cathode layer comprises a cathode active material,
wherein the cathode active material is a lithium transition metal oxide having a layered crystal structure, a lithium transition metal oxide having an olivine crystal structure, a lithium transition metal oxide having a spinel crystal structure, or a combination thereof.

27. The all-solid secondary battery of claim 1, wherein the cathode layer comprises a compound represented by Formula 1, a compound represented by Formula 2, or a combination thereof:

$$Li_aM_xPS_bX_cCl_d \qquad \text{Formula 1}$$

wherein, in Formula 1,
M is Na, K, Fe, Mg, Ca, Ag, Cu, Zr, Zn, or a combination thereof;
X is Br, I, or a combination thereof, and
$0 \leq x \leq 0.07$, $5 \leq a \leq 6$, $4 \leq b \leq 6$, $c>0$, $d>0$, $0<(c+d)\leq 2$, and $5\leq(a+x)\leq 6$, $$Li_aM_xPS_bCl_d \qquad \text{Formula 2}$$

wherein, in Formula 2,
M is Na, K, Fe, Mg, Ca, Ag, Cu, Zr, Zn, or a combination thereof; and
$0 \leq x \leq 0.07$, $5 \leq a \leq 6$, $4 \leq b \leq 6$, $0<d\leq 2$, and $5\leq(a+x)\leq 6$.

28. The all-solid secondary battery of claim 1, wherein the cathode layer comprises a cathode active material, a sulfide solid electrolyte, and a conductive agent,
wherein an amount of the sulfide solid electrolyte in the cathode layer is about 2 parts by weight to about 70 parts by weight, based on 100 parts by weight of the cathode layer.

29. A method of preparing the all-solid secondary battery of claim 1, the method including:
providing a cathode layer;
providing an anode layer;
contacting a first solid electrolyte and a binder to form a first composition;
contacting a second solid electrolyte and a binder to form a second composition;
disposing the first composition on a surface of the anode layer facing the cathode layer to form a first solid electrolyte layer, and
disposing the second composition on a surface of the cathode layer facing the anode layer to form a second electrolyte layer to provide the all-solid secondary battery,
wherein the second solid electrolyte has an argyrodite crystal structure represented by Formula 2, $$Li_aM_xPS_bCl_d \qquad \text{Formula 2}$$

wherein, in Formula 2,
M is Na, K, Fe, Mg, Ca, Ag, Cu, Zr, Zn, or a combination thereof; and
$0 \leq x \leq 0.07$, $5 \leq a \leq 6$, $4 \leq b \leq 6$, $0<d\leq 2$, and $5\leq(a+x)\leq 6$.

30. The all-solid secondary battery of claim 29, wherein the disposing of the first composition comprises:
coating the first composition on a surface of the anode layer, and
drying the first composition on a surface of the anode layer.

31. The all-solid secondary battery of claim 29, wherein the disposing of the second composition comprises:
coating the second composition on a substrate;
drying the second composition on a substrate to form a dried composition,
separating the dried composition from the substrate; and
placing the dried composition on a surface of the cathode layer facing the anode layer.

32. An all-solid secondary battery comprising:
a solid electrolyte layer disposed between an anode layer and a cathode layer,
wherein the solid electrolyte layer comprises a first solid electrolyte layer comprising a first solid electrolyte and a second solid electrolyte layer comprising a second solid electrolyte,
wherein the first solid electrolyte layer is disposed proximate to the anode layer, the second solid electrolyte layer is disposed proximate to the cathode layer,
wherein the second solid electrolyte has an argyrodite crystal structure represented by Formula 2, and
wherein the solid electrolyte layer has an argyrodite structure represented by Formula 6:

$$Li_aM_xPS_bCl_d \qquad \text{Formula 2}$$

wherein, in Formula 2,
M is Na, K, Fe, Mg, Ca, Ag, Cu, Zr, Zn, or a combination thereof; and $0 \leq x \leq 0.07$, $5 \leq a \leq 6$, $4 \leq b \leq 6$, $0<d\leq 2$, and $5\leq(a+x)\leq 6$, $$Li^+{}_{12-n-x}AX_{6-x}Y'_x \qquad \text{Formula 6}$$

wherein, in Formula 6,
A is P, As, Ge, Ga, Sb, Si, Sn, Al, In, Ti, V, Nb, Ta, or a combination thereof,
X is S, Se, Te, or a combination thereof,
Y' is Cl, Br, I, F, CN, OCN, SCN, $N_3$, or a combination thereof,
$1 \leq n \leq 6$ and $0<x<2$, wherein n is an oxidation number of A.

* * * * *